(12) United States Patent
Gruber et al.

(10) Patent No.: US 9,929,972 B2
(45) Date of Patent: Mar. 27, 2018

(54) SYSTEM AND METHOD OF SENDING DATA VIA A PLURALITY OF DATA LINES ON A BUS

(71) Applicant: QUALCOMM Incorporated, San Diego, CA (US)

(72) Inventors: Hans Georg Gruber, San Diego, CA (US); Magesh Hariharan, San Diego, CA (US); Julio Arceo, San Diego, CA (US); Suren Mohan, San Diego, CA (US); Aris J. Balatsos, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 13/714,140

(22) Filed: Dec. 13, 2012

(65) Prior Publication Data

US 2013/0156044 A1 Jun. 20, 2013

Related U.S. Application Data

(60) Provisional application No. 61/576,840, filed on Dec. 16, 2011.

(51) Int. Cl.
*G06F 13/00* (2006.01)
*G06F 13/14* (2006.01)
*H04L 12/911* (2013.01)
*G06F 13/42* (2006.01)

(52) U.S. Cl.
CPC .......... *H04L 47/726* (2013.01); *G06F 13/423* (2013.01); *G06F 13/4291* (2013.01)

(58) Field of Classification Search
CPC .......... G06F 1/324; G06F 1/3203; G06F 1/06; G06F 1/12; G06F 1/3253; G06F 1/3287; G06F 1/3296; G06F 1/08

USPC ................................................. 710/100, 305
See application file for complete search history.

(56) References Cited

U.S. PATENT DOCUMENTS 3,618,037 A * 11/1971 Wollum ............... G06F 13/385
709/250
3,766,531 A * 10/1973 Cooper ..................... H04L 5/02
710/316
4,032,899 A * 6/1977 Jenny ....................... G06F 15/17
710/316
4,547,880 A * 10/1985 De Vita ............... G06F 13/385
370/362

(Continued)

FOREIGN PATENT DOCUMENTS

JP H04348642 A 12/1992
JP 2000173173 A 6/2000

(Continued)

OTHER PUBLICATIONS

Backman, J., et al., "Slimbus: An Audio, Data and Control Interface for Mobile Devices", 29th International Conference: Audio for Mobile and Handheld Devices, Sep. 2, 2006, 10 pp.

(Continued)

*Primary Examiner* — Faisal M Zaman
(74) *Attorney, Agent, or Firm* — Toler Law Group, PC.

(57) ABSTRACT

A method includes sending data from a first serial low-power inter-chip media bus (SLIMbus) component to a second SLIMbus component. The method further includes sending the data via at least a first SLIMbus data line of a plurality of SLIMbus data lines.

48 Claims, 10 Drawing Sheets

(56) References Cited

U.S. PATENT DOCUMENTS

| | | | | |
|---|---|---|---|---|
| 5,008,880 A * | 4/1991 | Azuma | G06F 13/385 | 370/462 |
| 5,557,614 A * | 9/1996 | Sandler | H04J 3/0608 | 370/509 |
| 5,602,850 A * | 2/1997 | Wilkinson | G06F 13/4022 | 307/147 |
| 5,631,931 A * | 5/1997 | Takano | H03L 7/143 | 375/347 |
| 5,815,692 A * | 9/1998 | McDermott | G06F 1/10 | 713/501 |
| 6,079,024 A * | 6/2000 | Hadjimohammadi | G06F 13/4072 | 713/322 |
| 6,101,567 A * | 8/2000 | Kim et al. | 710/305 | |
| 6,119,263 A * | 9/2000 | Mowbray et al. | 714/781 | |
| 6,275,498 B1 | 8/2001 | Bisceglia et al. | | |
| 6,532,240 B1 * | 3/2003 | Jeong | H04M 7/0096 | 370/465 |
| 6,606,675 B1 * | 8/2003 | Godbole | G06F 1/10 | 710/100 |
| 6,973,519 B1 * | 12/2005 | Estakhri et al. | 710/104 | |
| 7,103,792 B2 | 9/2006 | Moon | | |
| 7,158,536 B2 | 1/2007 | Ching et al. | | |
| 7,188,263 B1 * | 3/2007 | Rubinstein | G06F 1/3209 | 713/300 |
| 7,197,591 B2 * | 3/2007 | Kwa | G06F 1/3203 | 326/86 |
| 7,277,973 B2 | 10/2007 | Bando | | |
| 7,370,132 B1 * | 5/2008 | Huang et al. | 710/307 | |
| 7,469,311 B1 * | 12/2008 | Tsu | G06F 13/4018 | 710/29 |
| 7,788,439 B1 * | 8/2010 | Tsu | G06F 13/4018 | 710/29 |
| 7,809,869 B2 * | 10/2010 | Atherton | G06F 13/387 | 710/104 |
| 7,991,938 B2 * | 8/2011 | Park | G06F 13/4018 | 710/307 |
| 8,205,028 B1 * | 6/2012 | Sakarda | G06F 1/3203 | 710/105 |
| 8,681,839 B2 * | 3/2014 | Bulzacchelli | H04L 25/14 | 375/220 |
| 8,762,760 B2 * | 6/2014 | Shafai | H04W 52/0206 | 710/57 |
| 2001/0014924 A1 | 8/2001 | Nishihara | | |
| 2002/0083241 A1 * | 6/2002 | Moller | G06F 1/3203 | 710/100 |
| 2003/0035435 A1 * | 2/2003 | Leonard | H04L 12/40019 | 370/445 |
| 2003/0158990 A1 * | 8/2003 | Allen | G06F 13/4086 | 710/305 |
| 2004/0187044 A1 * | 9/2004 | Barman | G06F 3/005 | 713/400 |
| 2004/0252800 A1 * | 12/2004 | Kota | H03L 7/18 | 375/354 |
| 2005/0094462 A1 * | 5/2005 | Jakobs | 365/222 | |
| 2005/0204079 A1 * | 9/2005 | Tai | H04J 3/00 | 710/52 |
| 2006/0165205 A1 * | 7/2006 | Dally | H03M 9/00 | 375/371 |
| 2006/0291323 A1 * | 12/2006 | Freebern | G11C 7/1012 | 365/233.1 |
| 2008/0313375 A1 * | 12/2008 | Van Vlimmeren et al. | 710/117 | |
| 2009/0063889 A1 * | 3/2009 | Dada et al. | 713/503 | |
| 2009/0074407 A1 * | 3/2009 | Hornbuckle | H04B 10/532 | 398/43 |
| 2009/0244999 A1 * | 10/2009 | Aitken | G11C 8/16 | 365/201 |
| 2009/0248978 A1 | 10/2009 | Solomon et al. | | |
| 2010/0005212 A1 * | 1/2010 | Gower et al. | 710/308 | |
| 2010/0077157 A1 * | 3/2010 | Gregorius | G06F 13/1605 | 711/149 |
| 2010/0189112 A1 * | 7/2010 | Nakata | 370/400 | |
| 2010/0191995 A1 | 7/2010 | Levy et al. | | |
| 2010/0253672 A1 * | 10/2010 | Ota | G09G 3/3611 | 345/213 |
| 2011/0138096 A1 * | 6/2011 | Radulescu | G06F 13/385 | 710/305 |
| 2011/0167185 A1 * | 7/2011 | O'brien | H04B 15/02 | 710/107 |
| 2012/0066434 A1 * | 3/2012 | Zitlaw | G06F 13/28 | 711/103 |
| 2012/0131404 A1 * | 5/2012 | Ramirez | G06F 11/25 | 714/733 |
| 2012/0278646 A1 | 11/2012 | Gruber et al. | | |
| 2012/0317300 A1 * | 12/2012 | Huang | H04L 65/4092 | 709/231 |
| 2013/0191563 A1 * | 7/2013 | Toba | H04N 5/775 | 710/62 |
| 2013/0241859 A1 * | 9/2013 | Saitoh | G06F 3/041 | 345/173 |

FOREIGN PATENT DOCUMENTS

| | | |
|---|---|---|
| JP | 2011513883 A | 4/2011 |
| WO | 2006063485 A1 | 6/2006 |
| WO | 2010002660 A2 | 1/2010 |
| WO | 2012149303 | 11/2012 |

OTHER PUBLICATIONS

International Search Report and Written Opinion—PCT/US2012/069800—ISA/EPO—dated May 2, 2013, 10 pp.

Boyce, Kenneth, An Introduction to the Mobile Industry Processor Interface (MIPI) Alliance Standard—Serial Low-Power Inter-Chip Media Bus (SLIMbus), MIPI Alliance, Inc., 2008, 20 pp.

* cited by examiner

SYSTEM AND METHOD OF SENDING DATA VIA A PLURALITY OF DATA LINES ON A BUS

I. CLAIM OF PRIORITY

This application claims priority from U.S. Provisional Patent Application No. 61/576,840, filed Dec. 16, 2011, entitled, "SYSTEM AND METHOD OF SENDING DATA VIA A PLURALITY OF DATA LINES ON A BUS," the contents of which are incorporated by reference in its entirety.

II. FIELD

The present disclosure is generally related to data transmission buses.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. When a wireless telephone includes such components, the components may communicate with each other via a common bus.

For example, the serial low-power inter-chip media bus (SLIMbus) standard is a communication bus standard well-suited for application in portable computing devices such as mobile phones. According to the SLIMbus standard, components are connected by a single SLIMbus data line and a single clock line. However, the single SLIMbus data line may provide limited bandwidth and throughput, resulting in an inability to send and receive data that requires a larger bandwidth and throughput (e.g., professional audio data and non-audio data, such as video data).

IV. SUMMARY

The disclosed techniques may increase the number of SLIMbus data lines on a SLIMbus communication bus and may result in an increased bandwidth and throughput and an ability to send and receive professional audio data and non-audio data, such as video data, via the SLIMbus communication bus. The present disclosure further describes systems and methods of duplicating existing ports that may provide connections for the increased number of SLIMbus data lines on the SLIMbus communication bus. Each SLIMbus data line may be associated with an independent clock frequency that may be responsive to a corresponding gear assignment of the SLIMbus data line.

In a particular embodiment, a method includes sending data from a first serial low-power inter-chip media bus (SLIMbus) component to a second SLIMbus component. The method further includes sending the data via at least a first SLIMbus data line of a plurality of SLIMbus data lines. For example, the method may include sending data via the first SLIMbus data line and via a second SLIMbus data line of the plurality of SLIMbus data lines. In alternate embodiments, more than two SLIMbus data lines may be used.

In another particular embodiment, an apparatus includes a first serial low-power inter-chip media bus (SLIMbus) component configured to send data to a second SLIMbus component via at least a first SLIMbus data line of a plurality of SLIMbus data lines. For example, the first SLIMbus component may send data to the second SLIMbus component via the first SLIMbus data line and via a second SLIMbus data line of the plurality of SLIMbus data lines. In alternate embodiments, more than two SLIMbus data lines may be used.

In another particular embodiment, a non-transitory computer readable storage medium includes operational instructions that, when executed by a processor, cause the processor to determine whether a SLIMbus component is compatible with a bus configuration that includes a plurality of SLIMbus data lines.

In another particular embodiment, a system includes a first SLIMbus component, a processor, and a memory storing instructions executable by the processor to determine whether the first SLIMbus component is compatible with a bus configuration that includes a plurality of SLIMbus data lines. The instructions are also executable by the processor to schedule one or more packets for transmission to the first SLIMbus component via one or more of the plurality of SLIMbus data lines based at least in part on the determination.

Particular advantages provided by at least one of the disclosed embodiments include creation of a plurality of SLIMbus data lines on a SLIMbus communication bus to increase the available bandwidth and throughput of the SLIMbus communication bus, which may result in an ability to send and receive data files that require a larger bandwidth and throughput (e.g., professional audio data and non-audio data).

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
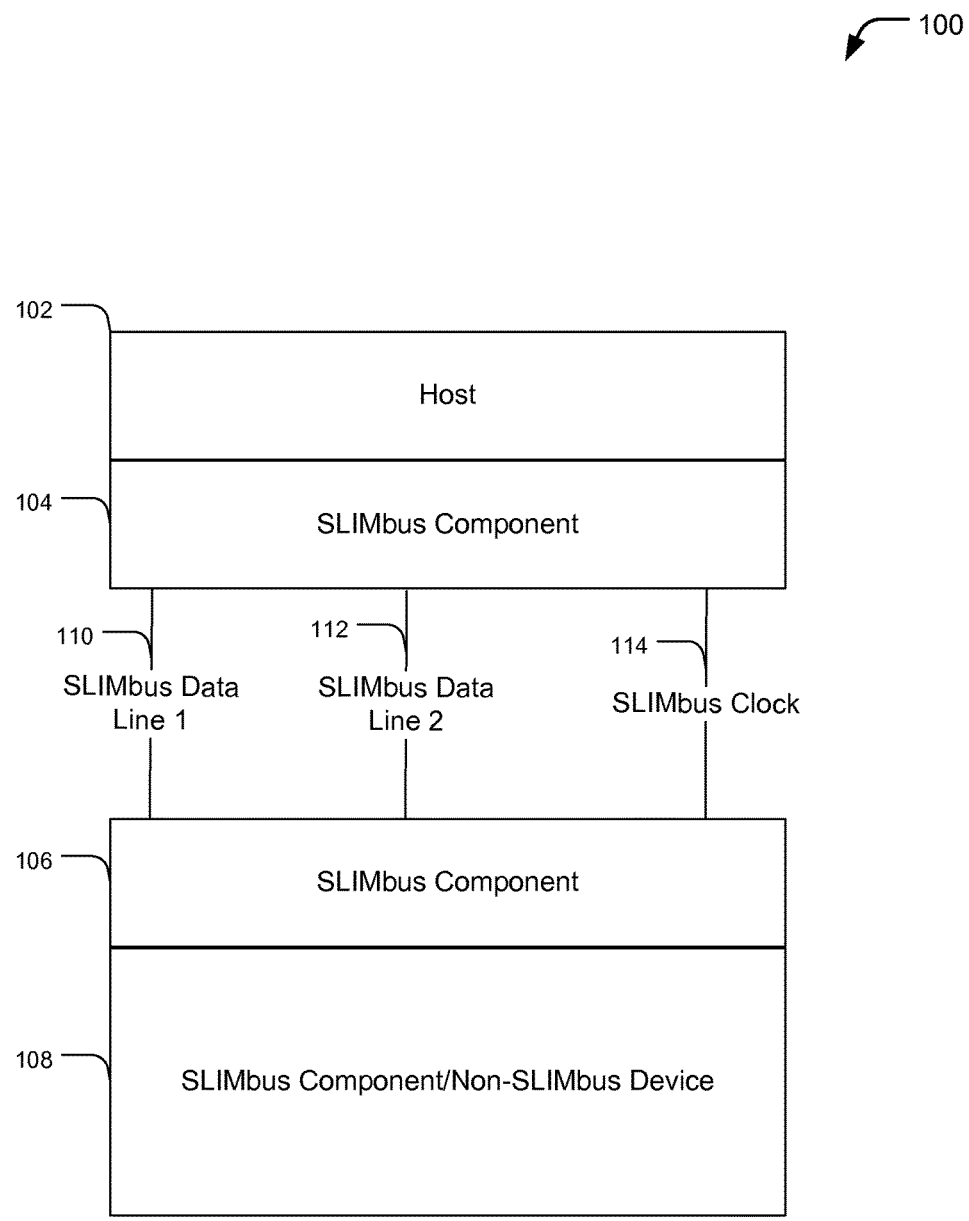
FIG. 1 is a block diagram to illustrate a particular embodiment of a system including a plurality of serial low-power inter-chip media bus (SLIMbus) data lines between two SLIMbus components.

FIG. 1 is a block diagram to illustrate a particular embodiment of a system 100 including a plurality of SLIMbus data lines 110, 112 between two SLIMbus components 104, 106. As further described herein, the use of multiple SLIMbus data lines may increase bandwidth and throughput on a SLIMbus communication bus that includes the SLIMbus data lines 110, 112 and a SLIMbus clock line 114.

The system 100 may include a host 102 coupled to a first SLIMbus component 104. The first SLIMbus component 104 may be coupled to a second SLIMbus component 106 via the plurality of SLIMbus data lines 110, 112 and via the SLIMbus clock line 114. In the embodiment of FIG. 1, the plurality of SLIMbus data lines 110, 112 includes the first SLIMbus data line 110 and the second SLIMbus data line 112. The second SLIMbus component 106 may be coupled to a third component 108. In a particular embodiment, the third component 108 may be a SLIMbus component or a non-SLIMbus device.

In a particular embodiment, the host 102 may include a processor such as a digital signal processor (DSP), a central processing unit (CPU), a graphics processing unit (GPU), a microprocessor, or any combination thereof. The host 102 may include a mobile station modem (MSM), a mobile data modem (MDM), a radio frequency transceiver (RTR), an application processor (APQ), or any combination thereof.

In a particular illustrative embodiment, the first SLIMbus data line 110 may support a first bandwidth and the second SLIMbus data line 112 may support a second bandwidth. As an illustrative non-limiting example, the first bandwidth may be 28 megabits per second (Mbps) and the second bandwidth may be 28 Mbps or greater. In this example, the second SLIMbus data line 112 may have a greater bandwidth than the first SLIMbus data line 110 based on the second SLIMbus data line 112 and the first SLIMbus data line 110 being clocked at different rates, as further described herein.

In a particular illustrative embodiment, each of the plurality of SLIMbus data lines 110, 112 may be a bi-directional data line. For example, the first SLIMbus data line 110 may be a bi-directional data line and the second SLIMbus data line 112 may be a bi-directional data line. As used herein, a bi-directional data line may be a data line that is capable of sending data in two opposite directions. Further, each of the plurality of SLIMbus data lines 110, 112 may be utilized to transmit data associated with a different power level throughput. For example, the first SLIMbus data line 110 may be utilized for low power traffic while the second SLIMbus data line 112 may be utilized for higher power traffic.

During operation, data may be sent from the first SLIMbus component 104 to the second SLIMbus component 106. As used herein, data may include audio data, non-audio data, pulse-code modulation (PCM) audio data, Sony Philips Digital Interface (SPDIF) data, High Definition Audio (HDA) data, professional audio data (i.e., 192 kHz, 24 bit as used in Dolby Surround 5.1/7.1, and certain Roland Music systems), or any combination thereof. The first SLIMbus component 104 may send data on a selected one or more particular SLIMbus data lines of the plurality of SLIMbus data lines 110, 112. For example, the data may be sent via the first SLIMbus data line 110, the second SLIMbus data line 112, or any combination thereof.

Alternately, or in addition, data may be sent from the second SLIMbus component 106 to the first SLIMbus component 104 on a selected one or more particular SLIMbus data lines of the plurality of SLIMbus data lines 110, 112. For example, the data may be sent via the first SLIMbus data line 110, the second SLIMbus data line 112, or any combination thereof.

In an illustrative embodiment, the first SLIMbus component 104 may send the data in parallel via multiple SLIMbus data lines or send the data serially via a single SLIMbus data line. Whether the data is sent in parallel or serially may depend on factors such as a size of the data, a clock frequency of at least one SLIMbus data line, a compatibility of the data with the SLIMbus data transmission protocol, or any combination thereof. For example, the first SLIMbus component 104 may send data in parallel via the first SLIMbus data line 110 and via the second SLIMbus data line 112. To illustrate, the data may be divided into two portions, and the portions may be transmitted concurrently, or substantially concurrently, via the SLIMbus data lines 110 and 112. Upon receipt, the data may be interleaved and/or concatenated. Alternatively, the first SLIMbus component 104 may send the data serially via the first SLIMbus data line 110 or send the data serially via the second SLIMbus data line 112. To illustrate, the data may be divided into two portions, and the portions may be transmitted one after the other via either the first SLIMbus data line 110 or the second SLIMbus data line 112. The data may be sent in accordance with the SLIMbus data transmission protocol, other time-division transmission protocols, or non time-division transmission protocols.

In a particular embodiment, the first SLIMbus component 104 may be configured to be compatible with a single SLIMbus data line configuration (e.g., a legacy, backward-compatible configuration). For example, the first SLIMbus component 104 may be configured to send data to the second SLIMbus component 106 only via the first SLIMbus data line 110. As will be described in FIG. 2 and FIG. 3, a port duplicator may provide a multiple SLIMbus data line interface to the first SLIMbus component 104 to enable the first component 104 to be compatible with a configuration that supports communication using the plurality of SLIMbus data lines 110, 112. The addition of the port duplicator may integrate the plurality of SLIMbus data lines 110, 112 to the system 100 without violating standards associated with the Mobile Industry Processor Interface (MIPI) SLIMbus Specification.

In a particular embodiment, the second SLIMbus component 106 may also be configured to be compatible with a single SLIMbus data line configuration. For example, the second SLIMbus component 106 may be configured to receive data from the first component 104 only via the first SLIMbus data line 110. As will be described in FIG. 2 and FIG. 3, a port duplicator may provide a multiple SLIMbus data line interface to the second SLIMbus component 106 to enable the second component 106 to be compatible with a configuration that supports communication using the plurality of SLIMbus data lines 110, 112.

In a particular embodiment, the third device 108 may be configured to be compatible with a configuration that supports the plurality of SLIMbus data lines 110, 112, as described herein. For example, the third device 108 may be configured to receive data from the first component 104 via the plurality of SLIMbus data lines 110, 112. Data sent to the third device 108 may be transmitted in accordance with a non-SLIMbus protocol (e.g., a non time division protocol or a time-division protocol other than the SLIMbus data transmission protocol).

In a particular embodiment, each SLIMbus data line of the plurality of SLIMbus data lines 110, 112 may correspond to different SLIMbus components. For example, the first and second components 104, 106 may be configured to receive and transmit data via the first SLIMbus data line 110 and the SLIMbus clock line 114. In addition, a third and fourth SLIMbus component (not shown) may be configured to receive and transmit data via the second SLIMbus data line 112 and the SLIMbus clock line 114. Thus, the same SLIMbus clock line 114 may control timing and rates of data transfer between different components or sets of components that each use a separate SLIMbus data line.

It will be appreciated that a legacy SLIMbus device that is configured for compatibility with a single SLIMbus data line and a single SLIMbus clock line may be connected with the plurality of SLIMbus data lines 110, 112. In addition, devices configured for compatibility with multiple SLIMbus data lines may coexist in the system 100 with the legacy devices. It will be appreciated that the plurality of SLIMbus data lines 110, 112 may result in increased bandwidth and throughput. Moreover, the bandwidth and throughput increase may be achieved with relatively little increase in die size when compared to SLIMbus systems that attempt to increase bandwidth by replicating SLIMbus components (which may occupy much larger die area than additional data line(s)). The system 100 of FIG. 1 may thus support high-bandwidth data transmission (e.g., an ability to send and receive professional audio data and non-audio data) between SLIMbus components.

Figure 2:
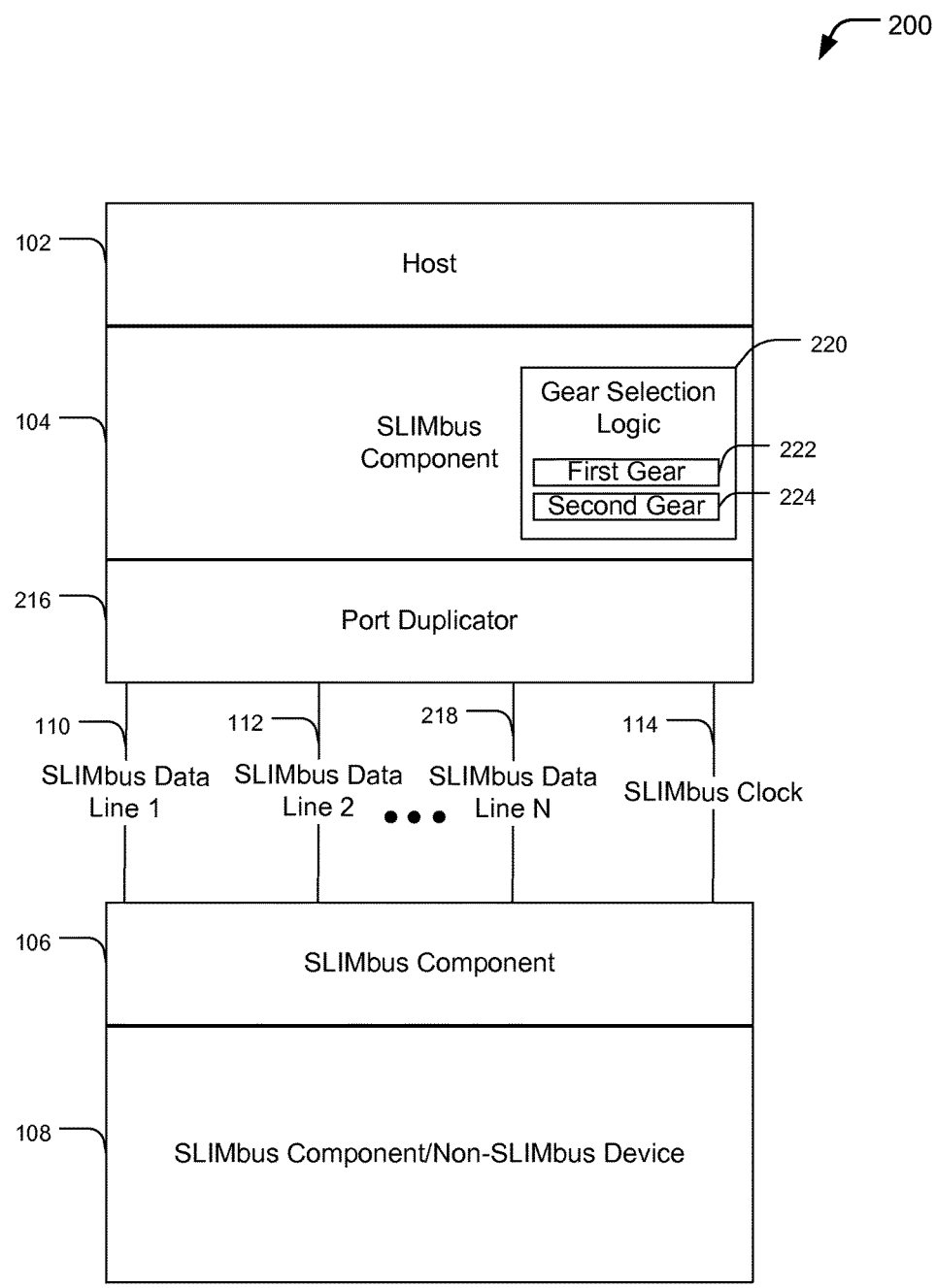
FIG. 2 is a block diagram to illustrate another particular embodiment of a system including a plurality of SLIMbus data lines between two SLIMbus components.

FIG. 2 is a block diagram to illustrate another particular embodiment of a system 200 including the plurality of SLIMbus data lines 110, 112 between the two SLIMbus components 104, 106. In contrast to FIG. 1, FIG. 2 illustrates at least three SLIMbus data lines (e.g., "N" SLIMbus data lines, including an Nth SLIMbus data line 218).

The system 200 may include the host 102 coupled to the first SLIMbus component 104. The first SLIMbus component 104 may be coupled to a port duplicator 216. The port duplicator 216 may be coupled to the second SLIMbus component 106 (or a corresponding port duplicator coupled to the second SLIMbus component 106) via the plurality of SLIMbus data lines 110, 112, and 218 and via the SLIMbus clock line 114. The second SLIMbus component 106 may be coupled to the third component 108.

The first SLIMbus component 104 may include gear selection logic 220. In a particular illustrative embodiment, the gear selection logic 220 may be configured to clock each of the plurality of data lines 110, 112, and 218 at multiple gears, including a first gear 222 and a second gear 224. In a particular embodiment, the gear selection logic 220 may select any of ten gears, where each gear corresponds to a different clock frequency (e.g., multiple or quotient of a "native" clock frequency of the system 200). For example, downshifting one gear may halve the clock frequency and upshifting one gear may double the clock frequency. The gear selection logic 220 may be configured to alter a first clock frequency of the first SLIMbus data line 110 independently of a second clock frequency of the second SLIMbus data line 112, and independently of an Nth clock frequency of the Nth SLIMbus data line 218.

In a particular illustrative embodiment, the first clock frequency of the first SLIMbus data line 110 may be altered (i.e., increased by powers of two or decreased by powers of two) by changing a corresponding gear associated with the first SLIMbus data line 110. For example, the first clock frequency of the first SLIMbus data line 110 may be increased by changing the corresponding gear associated with the first SLIMbus data line 110 from the first gear 222 to the second gear 224. Alternatively, the first clock frequency of the first SLIMbus data line 110 may be decreased by changing the corresponding gear associated with the first SLIMbus data line 110 from the second gear 224 to the first gear 222.

The second clock frequency of the second SLIMbus data line 112 may be altered (i.e., increased by powers of two or decreased by powers of two) by changing a corresponding gear associated with the second SLIMbus data line 112. For example, the second clock frequency of the second SLIMbus data line 112 may be increased by changing the corresponding gear associated with the second SLIMbus data line 112 from the first gear 222 to the second gear 224. Alternatively, the second clock frequency of the second SLIMbus data line 112 may be decreased by changing the corresponding gear associated with the second SLIMbus data line 112 from the second gear 224 to the first gear 222.

The various SLIMbus data lines 110, 112, 218 may be clocked at the same gear or may be clocked at different gears. In a particular embodiment, the first clock frequency of the first SLIMbus data line 110 may be equal to the second clock frequency of the second SLIMbus data line 112. For example, both the first clock frequency and the second clock frequency may be responsive to the first gear 222. Alternatively, the first clock frequency of the first SLIMbus data line 110 may be different from the second clock frequency of the second SLIMbus data line 112. For example, the first clock frequency may be responsive to the first gear 222 of the first SLIMbus component 104 and the second clock frequency may be responsive to the second gear 224 of the first SLIMbus component 104. In a particular embodiment, the SLIMbus data lines 110, 112, 218 may be clocked in accordance with a successive gear scheme (e.g., at gear X, gear X+1, and gear X+2).

The port duplicator 216 may be configured to provide a multiple SLIMbus data line interface to a port that is compatible with data transmission via a single SLIMbus data line to enable data transmission via the plurality of SLIMbus data lines 110, 112, 218. For example, the port duplicator 216 may be configured to provide an interface compatible for the plurality of SLIMbus data lines 110, 112, 218 to communicate with a legacy port that would otherwise only be compatible with sending and receiving data via the first SLIMbus data line 110.

During operation, the port duplicator 216 may be configured to selectively determine which one of the one or more SLIMbus data lines of the plurality of SLIMbus data lines 110, 112, 218 to utilize when sending data. For example, the port duplicator 216 may selectively determine to send data via the first SLIMbus data line 110, via the second SLIMbus data line 112, via the Nth SLIMbus data line 218, or any combination thereof.

In a particular illustrative embodiment, the determination of how many and which SLIMbus data lines to use during data transmission may be based at least in part on a compatibility of the data with the SLIMbus data transmission protocol, a compatibility of the receiving SLIMbus component 106 with the SLIMbus data transmission protocol, or any combination thereof. For example, the first SLIMbus component 104 and the second SLIMbus component 106 may be configured to be compatible with a single SLIMbus data line configuration and data that is compatible with the SLIMbus data transmission protocol, while the third device 108 may be configured to be compatible with multiple transmission protocols and configurations (e.g., the SLIMbus data transmission protocol, a configuration that supports data transmission on a plurality of SLIMbus data lines, data that is not compatible with the SLIMbus data transmission protocol, data that is compatible with the SLIMbus data transmission protocol, or any combination thereof).

In a particular illustrative embodiment, the second SLIMbus data line 112 and the Nth SLIMbus data line 218 may be configured to transport all types of data while the first SLIMbus data line 110 may be configured to only transport data that is compatible with the SLIMbus data transmission protocol. For example, if data is to be sent to the third device 108, the port duplicator 216 may selectively determine to send data via the second SLIMbus data line 112, the Nth SLIMbus data line 218, or any combination thereof. Alternatively, if data that is compatible with the SLIMbus data transmission protocol is to be sent to the second SLIMbus component 106, the port duplicator 216 may selectively determine to send data via the first SLIMbus data line 110, the second SLIMbus data line 112, the Nth SLIMbus data line 218, or any combination thereof. A component may be programmed to check for data on a single SLIMbus data line or a plurality of SLIMbus data lines via a programming or control message, as described in FIG. 3. The plurality of data lines 110, 112, 218 may concurrently transmit data that is compatible with the SLIMbus protocol and data that is not compatible with the SLIMbus protocol.

It should be noted that the use of two or three SLIMbus data lines may simplify scheduling in the case of certain types of data. For example, 16-bit audio data may be divided into two 8-bit audio streams that are simultaneously transmitted across two SLIMbus data lines. As another example, 24-bit audio data may be divided into three 8-bit audio streams that are simultaneously transmitted across three SLIMbus data lines. Scheduling transmission of 8-bit audio frames may be relatively straightforward as compared to scheduling of 16-bit or 24-bit audio frames. Moreover, when multiple SLIMbus data lines are used, the associated SLIMbus clock line may be clocked at a lower frequency, which may reduce power consumption.

It will be appreciated that legacy SLIMbus components may be connected with the plurality of SLIMbus data lines 110, 112, 218 via the port duplicator 216 so that the legacy SLIMbus components and other components may co-exist within a system. It will further be appreciated that the port duplicator 216 may enable incorporation of additional SLIMbus data lines without replicating SLIMbus components and infrastructure that could require an increased pin count. It will also be appreciated that improved power management may result from managing (e.g., altering) the gears of each SLIMbus data line of the plurality of SLIMbus data lines 110, 112, 218.

Figure 3:
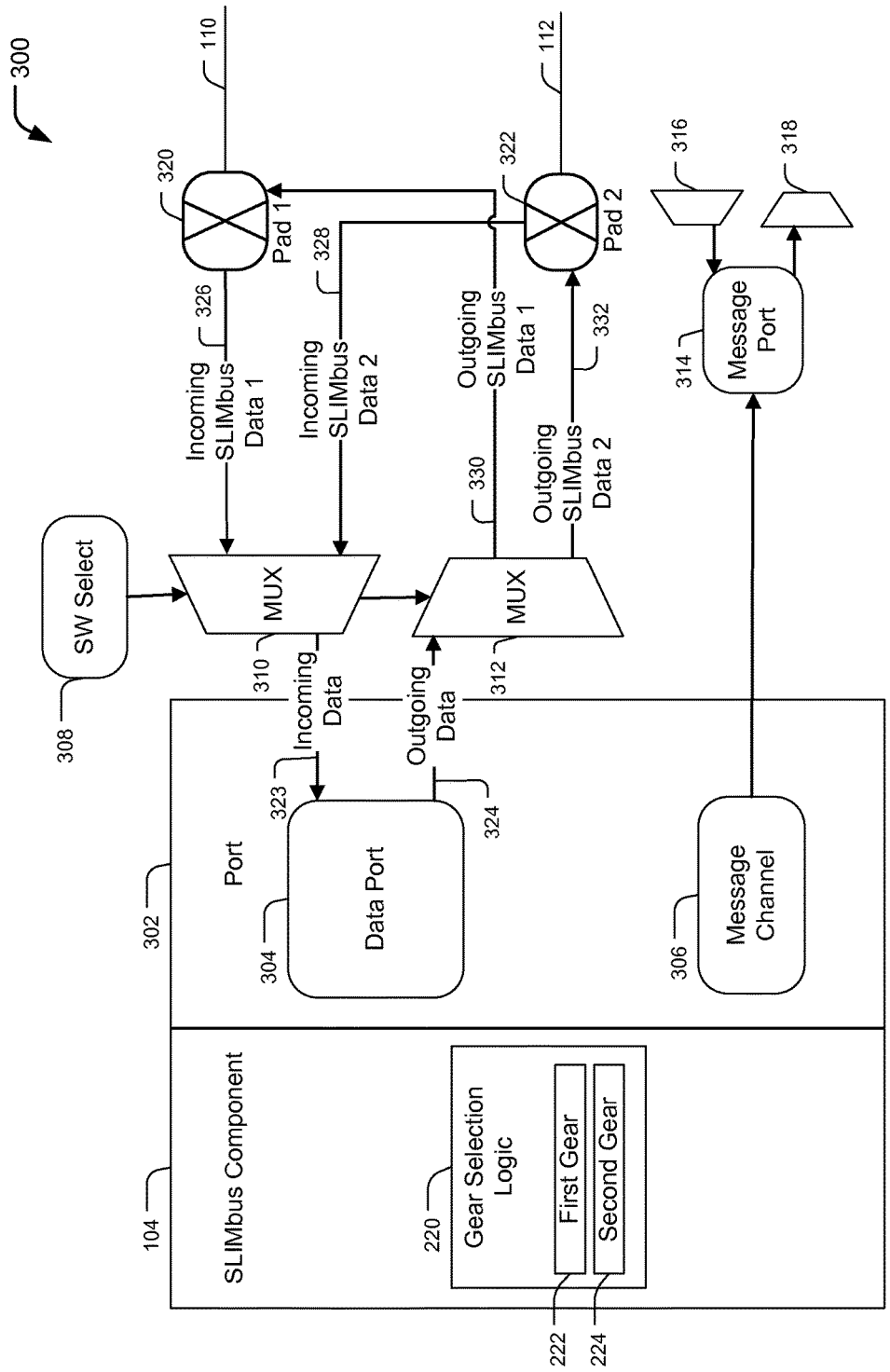
FIG. 3 is a diagram to illustrate a particular embodiment of a system to provide a multiple SLIMbus data line interface to a port to enable data transmission via a plurality of SLIMbus data lines.

FIG. 3 is a diagram to illustrate a particular embodiment of a system 300 operable to provide a multiple SLIMbus data line interface to a port to enable data transmission via a plurality of SLIMbus data lines. The system 300 may include the first SLIMbus component 104 coupled to a port 302.

In a particular illustrative embodiment, the first SLIMbus component 104 may include the gear selection logic 220. The gear selection logic 220 may include the first gear 222 and the second gear 224. The gear selection logic 220 may be configured to alter a clock frequency of incoming data 323, outgoing data 324, the first SLIMbus data line 110, the second SLIMbus data line 112, or any combination thereof. Alternatively, or in addition, the gear selection logic 220 may be configured to alter a clock frequency of first incoming SLIMbus data 326 (e.g., received via a first pad 320), a clock frequency of second incoming SLIMbus data 328 (e.g., received via a second pad 322), a clock frequency of first outgoing SLIMbus data 330 (e.g., to be sent via the first pad 320), a clock frequency of second outgoing SLIMbus data 332 (e.g., to be sent via the second pad 322), or any combination thereof.

In a particular illustrative embodiment, the port 302 may include a data port 304. An input to the data port 304 may include the incoming data 323 and an output to the data port 304 may include the outgoing data 324. The port 304 may also include a message channel 306. The first SLIMbus component 104 may use the port 302 as an interface to connect with the second SLIMbus component 106 via at least one SLIMbus data line.

In a particular illustrative embodiment, the system 300 may also include a first multiplexer 310. The first multiplexer 310 may receive the first incoming SLIMbus data 326 and the second incoming SLIMbus data 328 as inputs from the first pad 320 and the second pad 322, respectively. The first multiplexer 310 may also receive a switch select signal 308 as an input. In a particular embodiment, the switch select signal 308 may be controlled via software executed by the SLIMbus component 104 or a processor (e.g., the host 102) associated therewith. In a particular embodiment, the switch select signal 308 may have a value based on whether data is to be sent and/or received in parallel via multiple SLIMbus data lines or via a single SLIMbus data line. The first multiplexer 310 may output incoming data 323 to the data port 304.

In a particular illustrative embodiment, the system 300 may also include a second multiplexer 312. The second multiplexer 312 may receive the outgoing data 324 from the data port 304 and the switch select signal 308 as inputs. The second multiplexer 312 may output the first outgoing SLIMbus data 330 and the second outgoing SLIMbus data 332 to the first pad 320 and the second pad 322, respectively.

The switch select signal 308 may indicate to transmit data that is compatible with the SLIMbus data transmission protocol via the first SLIMbus data line 110 (i.e., the first incoming SLIMbus data 326 and the first outgoing SLIMbus data 330) or via the second SLIMbus data line 112 (i.e., the second incoming SLIMbus data 328 and the second outgoing SLIMbus data 332). Alternatively, the switch select signal 308 may indicate to transmit data that is not compatible with the SLIMbus data transmission protocol via the second SLIMbus data line 112.

The first multiplexer 310 may be associated with the incoming data 323 to the data port 304 and the second multiplexer 312 may be associated with the outgoing data from the data port 304. A port duplicator (e.g., the port duplicator 216 of FIG. 2) may be configured to provide a multiple SLIMbus data line interface to a port that is compatible with data transmission via a single SLIMbus data line to enable data transmission via the plurality of SLIMbus data lines 110, 112, 218.

For example, the data port 304 may be compatible with data transmission via a single SLIMbus data line. To illustrate, the data port 304 may be compatible to send and receive data only via the first SLIMbus data line 110. In a particular embodiment, the first multiplexer 310 and the second multiplexer 312 may provide an interface to enable data transmission via the first SLIMbus data line 110 (i.e., the first incoming SLIMbus data 326 and the first outgoing SLIMbus data 330), the second SLIMbus data line 112 (i.e., the second incoming SLIMbus data 328 and the second outgoing SLIMbus data 332), or any combination thereof.

The first SLIMbus data line 110 may support the SLIMbus data transmission protocol while the second SLIMbus data line 112 may support a SLIMbus data transmission protocol, a non SLIMbus data transmission protocol, or any combination thereof. For example, the incoming data 323 and the outgoing data 324 that is compatible with the SLIMbus data transmission protocol may be routed to the first pad 320, the second pad 322, or any combination thereof. The incoming data 323 and the outgoing data 324 that is not compatible with the SLIMbus data transmission protocol may be routed only to the second pad 322.

The first SLIMbus component 104 and the second SLIMbus component 106 may be configured to be compatible with a single SLIMbus data line SLIMbus configuration while the third device 108 may be configured to be compatible with a single SLIMbus data line SLIMbus configuration and a multiple SLIMbus data line SLIMbus configuration. In this particular illustrative embodiment, if data is to be sent to the third device 108, the data may be routed to the second pad 322. Alternatively, if data is to be sent to the second SLIMbus component 106, the data may be routed to the first pad 320, the second pad 322, or any combination thereof. Thus, SLIMbus components may be configured to monitor one data line or multiple data lines. A particular example of configuring SLIMbus components is further described with reference to FIGS. 5-6. Legacy components having only one data pin may be programmed to monitor one data line. Non-legacy components having multiple data pins may dynamically switch between monitoring one data line (e.g., when increased bandwidth/throughput is not required) or multiple data lines (e.g., during a high bandwidth/throughput application).

In a particular illustrative embodiment, the system 300 may also include a message port 314. The message port 314 may receive an input from a message channel 306 of the port 302. The message port 314 may also receive an input from a third multiplexer 316. The message port 314 may send an output to a fourth multiplexer 318. The message port 314 may be configured to control the bandwidth of the plurality of SLIMbus data lines 110, 112, 218. The message port 314 may be configured to alert the each of the plurality of SLIMbus data lines 110, 112, 218 to transmit data from the first SLIMbus component 104 to the second SLIMbus component 106.

The message port 314 may utilize the same single and multiple pad configurations as the data port 304 for messages. In a particular embodiment, the message port 314 may be used to send and receive configuration messages (e.g., user-defined messages), as further described with reference to FIGS. 5-6.

It will be appreciated that providing a multiple SLIMbus data line interface to a port that is compatible with data transmission via a single SLIMbus data line may allow single SLIMbus data line SLIMbus configuration systems to utilize the plurality of SLIMbus data lines without duplicating SLIMbus components. This may result in higher flexibility and scalability in systems that include legacy SLIMbus components.

Figure 4:
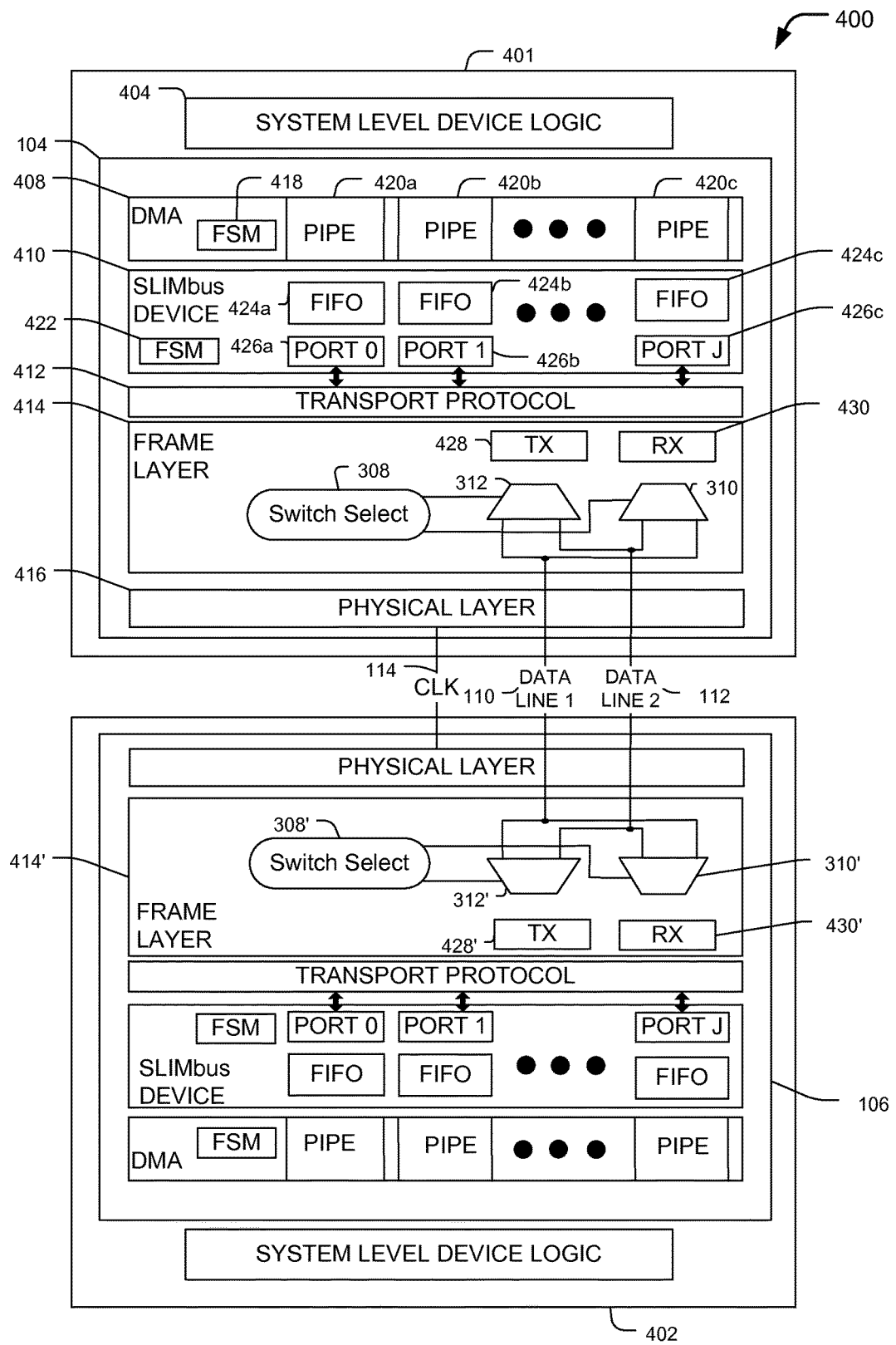
FIG. 4 is a diagram to illustrate another particular embodiment of a system including a plurality of SLIMbus data lines between two SLIMbus components.

FIG. 4 is a diagram to illustrate another particular embodiment of a system 400 including the plurality of SLIMbus data lines 110, 112 between the two SLIMbus components 104, 106.

The system 400 may include a first chip 401 and a second chip 402. In a particular embodiment, each chip 401 and 402 may correspond to a particular device, such as a processor, coder/decoder (CODEC), input device, output device, etc. The first chip 401 may include the first SLIMbus component 104 and system level device logic 404. In a particular embodiment, the host 102 of FIG. 1 may include the system level device logic 404 of FIG. 4. The second chip 402 may include the second SLIMbus component 106 and second system level device logic 406. The first SLIMbus component 104 may be coupled to the second SLIMbus component 106 via the plurality of SLIMbus data lines 110, 112 and the SLIMbus clock line 114.

In a particular embodiment, the first SLIMbus component 104 may include a direct memory access layer 408, a SLIMbus device layer 410, a transport protocol layer 412, a frame layer 414, and a physical layer 416. The direct memory access layer 408 may include a first finite state machine (FSM) 418, a first pipe 420a, a second pipe 420b, and an Nth pipe 420c. In a particular embodiment, the pipes may be configured as message channels that transmit messages (e.g., data messages and/or user-defined configuration messages), as further described with reference to FIG. 5.

The SLIMbus device layer 410 may be a generic device layer, an interface device layer, a framer device layer, a manager device layer, or any combination thereof. In a particular embodiment, the SLIMbus device layer 410 may include a second finite state machine (FSM) 422, a first First-In-First-Out (FIFO) buffer 424a, a second FIFO buffer 424b, an Nth FIFO buffer 424c, a first port (PORT 0) 426a, a second port (Port 1) 426b, and an Nth port (Port J) 426c. Each port may be connected to a corresponding FIFO buffer. For example, the first port 426a may be connected to the first FIFO buffer 424a, the second port 426b may be connected to the second FIFO buffer 424b, and the Nth port 426c may be connected to the Nth FIFO buffer 424c.

In some alternate embodiments, each port may be coupled to two FIFO buffers, which may enable bi-directional data transfer capabilities of each individual port. For example, first port 426a may be connected to the first FIFO buffer 424a and the second FIFO buffer 424b. In addition, the ports may support asynchronous connections resulting in more ports being available in the system 400. It will be appreciated that the use of dual-FIFO ports may effectively double an overall number of available ports in a system, because a single pair of ports may be used for bi-directional communication between two devices instead of using a dedicated pair of uplink ports and a dedicated pair of downlink ports.

The frame layer 414 may generate the switch select signal 308 and may include the first multiplexer 310 and the second multiplexer 312. The first multiplexer 310 may be associated with transmitting 428 data and the second multiplexer 312 may be associated with receiving 430 data. The switch select signal 308 may cause the first multiplexer 310 to transmit data via the first SLIMbus data line 110, the second SLIMbus data line 112, or any combination thereof, to a fourth multiplexer 310' of a frame layer 414' of the second SLIMbus component 106. The fourth multiplexer 310' may receive the incoming data based on a signal from a second switch select signal 308' of the frame layer 414' of the second SLIMbus component 106. Alternatively, the switch select signal 308 may cause the second multiplexer 310 to receive data via the first SLIMbus data line 110, the second SLIMbus data line 112, or any combination thereof, from a third multiplexer 312' of the frame layer 414' of the second SLIMbus component 106. The third multiplexer 312' may transmit the outgoing data based on a signal from the second switch select signal 308'. The third multiplexer 312' may be associated with transmitting 428' data and the fourth multiplexer 310' may be associated with receiving 430' data. The second chip 402 may also include a transport protocol layer, a generic device layer, a DMA layer, and system level device logic, as illustrated.

In an alternate embodiment, the frame layer 414 may include a single multiplexer. To illustrate, the first SLIMbus component 104 may include two frame layers, each including a single multiplexer. In another particular embodiment, the transport protocol layer 412 may include the first multiplexer 310 and the second multiplexer 312, and an additional SLIMbus clock line may be used. However, because a SLIMbus clock line may consume more power (e.g., 60-70% of total power) than a SLIMbus data line, implementations involving multiple SLIMbus clock lines may be avoided to save power.

Figure 5:
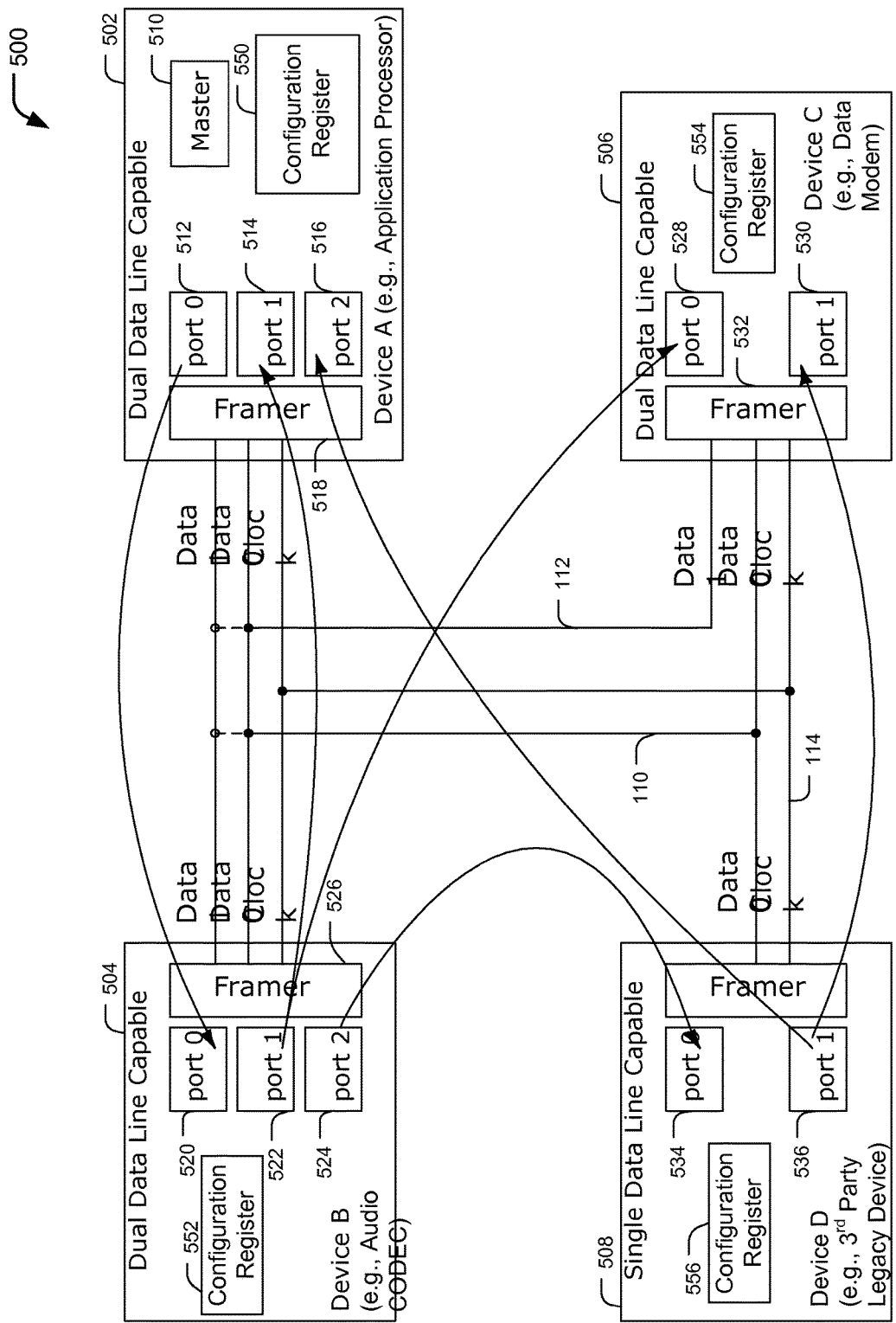
FIG. 5 is a diagram to illustrate a particular embodiment of a system that includes both dual line capable SLIMbus components and single line capable SLIMbus components.

FIG. 5 is a diagram to illustrate a particular embodiment of a system 500 that includes both dual data line capable SLIMbus components and single data line capable SLIMbus components.

Each dual data line capable or single data line capable SLIMbus component may be part of or connected to a device. For example, in FIG. 5, the system 500 includes a first device 502 that has dual data line capability, a second device 504 that has dual data line capability, a third device 506 that has dual data line capability, and a fourth device 508 that is single data line capable (e.g., a legacy device).

In a particular embodiment, the first device 502 (designated Device A) may be an application processor. The first device 502 may include a master 510, a first port (Port 0) 512, a second port (Port 1) 514, and a third port (Port 2) 516. The first device 502 may also include a framer 518. In an illustrative embodiment, the framer 518 may correspond to the frame layer 414 of FIG. 4.

In a particular embodiment, the second device 504 (designated Device B) may be an audio CODEC. The second device 504 may include a first port (Port 0) 520, a second port (Port 1) 522, and a third port (Port 2) 524. The second device 504 may also include a framer 526. In an illustrative embodiment, the framer 526 may correspond to the frame layer 414 of FIG. 4.

In a particular embodiment, the third device 506 (designated Device C) may be a data modem. The third device 506 include a first port (Port 0) 528 and a second port (Port 1) 530. The third device 506 may also include a framer 532. In an illustrative embodiment, the framer 532 may correspond to the frame layer 414 of FIG. 4.

In a particular embodiment, the fourth device 508 (designated Device D) may be a third party legacy device (e.g., manufactured by a third party that is unaware of the possibility of SLIMbus configurations involving multiple data line connections between devices). For example, the fourth device 508 may be an input or output device, such as a speaker or a microphone. The fourth device 508 may include a first port (Port 0) 534 and a second port (Port 1) 536. The fourth device 508 may also include a framer 538. In an illustrative embodiment, the framer 538 may function as described with reference to the frame layer 414 of FIG. 4.

During operation, a manager may configure the system 500 based on determining whether the SLIMbus components of each of the devices 502-508 is single data line capable or multiple (e.g., dual) data line capable. In particular embodiments, the manager may be implemented as hardware, software (e.g., executing at a processor, such as the first device 502 when the first device 502 is an application processor), firmware, or any combination thereof. The manager may determine the configuration (i.e., the SLIMbus data line capability) of SLIMbus components during an enumeration process. For example, during enumeration, the manager may determine that the first device 502, the second device 504, and the third device 506 have dual data line capable SLIMbus components and that the fourth device 508 has a single data line capable SLIMbus component.

In a particular embodiment, a manager may determine the capabilities of each SLIMbus component in a system by querying one or more configuration registers 550, 552, 554, 556 in each SLIMbus component or device, where the configuration register(s) 550, 552, 554, 556 store capability information. In a particular embodiment, the capability information may be set by a device manufacturer and may not be modifiable once set.

Alternatively, the capabilities of each SLIMbus component may be determined via communication between high-level operating systems (HLOSs). For example, a HLOS associated with a particular device may include a configuration file and exchange capability bits with each device. Alternatively, the HLOS may use a look-up table and/or query a configuration database for capability information.

In another particular embodiment, the capabilities of each SLIMbus component may be determined via dedicated messaging (e.g., transmitted from a message port, such as the message port 314 of FIG. 3) via a message channel. To illustrate, one or more user-defined messages may be transmitted between SLIMbus components, where the user-defined messages include data indicating whether the SLIMbus components are single data line and/or dual data line capable (i.e., the configuration of each SLIMbus component).

After capabilities of the various SLIMbus components in the system 500 are determined, the system 500 may be configured (e.g., programmed) to operate in accordance with a particular bus configuration. A particular example of a bus configuration and operation of the system 500 of FIG. 5 is further described with reference to FIG. 6.

Figure 6:
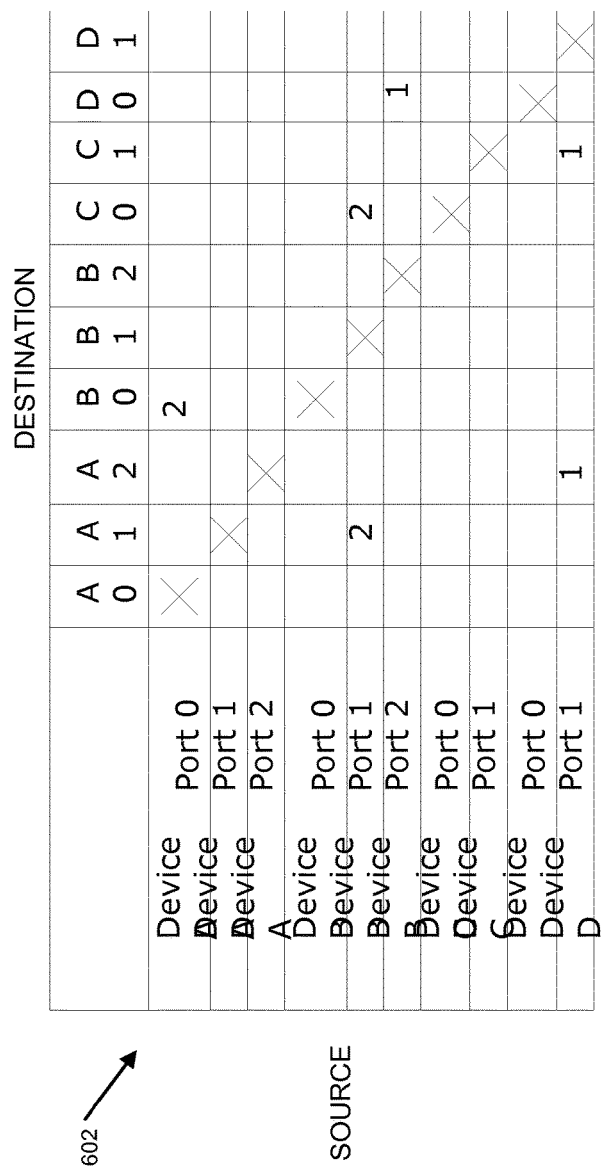
FIG. 6 is a diagram to illustrate a particular embodiment of configuration at the system of FIG. 5.

FIG. 6 is a diagram 600 to illustrate a particular embodiment of configuration during operation of the system 500 of FIG. 5. For example, a table 602 illustrates a particular bus configuration (e.g., port configurations of each device 502-508 in FIG. 5). In the embodiment of FIG. 6, rows of the table 602 represent source ports and columns of the table 602 represent destination ports.

For example, as illustrated in the table 602 (and by port-to-port arcs in FIG. 5), a dual data line connection may be established from Device A, Port 0 to Device B, Port 0. That is when data is sent from the first port 512 of Device A to the first port 520 of Device B, the data may be transmitted via both the first SLIMbus data line 110 and the second SLIMbus data line 112. Similarly, dual data line connections may be established from Device B, Port 1 to Device A, Port 1, and from Device B, Port 1 to Device C, Port 0. However, as described above with reference to FIG. 5, Device D has only a single data line capable SLIMbus component. Therefore, connections involving Device D may be single data line connections. For example, as illustrated in the table 602, single data line connections may be established from Device B, Port 2 to Device D, Port 0 and from Device D, Port 1 to Device C, Port 1.

After configuration/programming messages are transmitted to each SLIMbus component, a "RECONFIG_NOW" message may be transmitted to each SLIMbus component.

In response to receiving the "RECONFIG_NOW" message, each of the SLIMbus components may begin operating in accordance with the previously transmitted configuration/programming message at the appropriate frame boundary. The "RECONFIG_NOW" message may thus synchronize configuration/programming of the SLIMbus components. Examples of scheduling data for communication via one or more SLIMbus data lines are further described with respect to FIG. 8.

It will be appreciated that the capability to transmit data over the plurality of SLIMbus data lines 110, 112 during the same frame may allow the clock speed of the SLIMbus clock line 114 to be decreased. It will further be appreciated that decreasing the speed of the SLIMbus clock line 114 may result in reduced power consumption. The bus configuration represented by FIG. 6 may thus result in increased throughput and reduced power consumption at the system 500 of FIG. 5.

Figure 7:
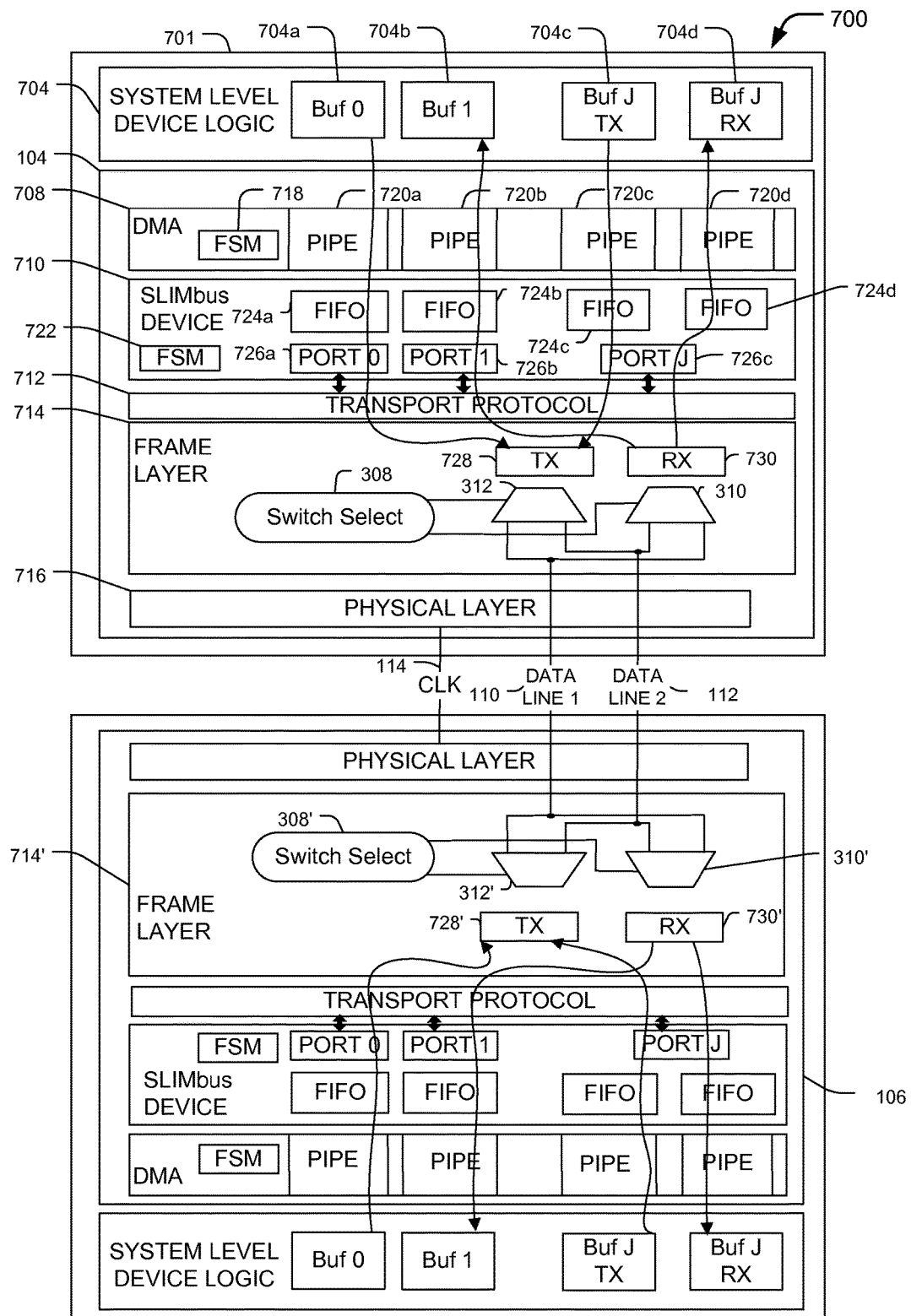
FIG. 7 is another diagram to illustrate a particular embodiment of a system that includes both dual line capable SLIMbus components and single line capable SLIMbus components.

FIG. 7 is a diagram to illustrate another particular embodiment of a system 700 including the plurality of SLIMbus data lines 110, 112 between the two SLIMbus components 104, 106.

The system 700 may include a first chip 701 and a second chip 702. In a particular embodiment, each chip 701 and 702 may correspond to a particular device, such as a processor, a coder/decoder (CODEC), an input device, an output device, etc. The first chip 701 may include the first SLIMbus component 104 and system level device logic 704. The system level device logic 704 may include a first buffer (Buf 0) 704a, a second buffer (Buf 1) 704b, a third buffer (Buf J TX) 704c, and a fourth buffer (Buf J RX) 704d. In a particular embodiment, the host 102 of FIG. 1 may include the system level device logic 704 of FIG. 7. The second chip 702 may include the second SLIMbus component 106 and second system level device logic. The first SLIMbus component 104 may be coupled to the second SLIMbus component 106 via the plurality of SLIMbus data lines 110, 112 and the SLIMbus clock line 114.

In a particular embodiment, the first SLIMbus component 104 may include a direct memory access (DMA) layer 708, a SLIMbus device layer 710, a transport protocol layer 712, a frame layer 714, and a physical layer 716. The direct memory access layer 708 may include a first finite state machine (FSM) 718, a first pipe 720a, a second pipe 720b, a third pipe 720c, and a fourth pipe 720d. As explained with respect to FIGS. 4-5, the pipes may be configured as message channels that transmit and receive messages (e.g., data messages and/or user-defined configuration messages).

The SLIMbus device layer 710 may be a generic device layer, an interface device layer, a framer device layer, a manager device layer, or any combination thereof. In a particular embodiment, the SLIMbus device layer 710 may include a second finite state machine (FSM) 722, a first First-In-First-Out (FIFO) buffer 724a, a second FIFO buffer 724b, a third FIFO buffer 724c, a fourth FIFO buffer 724d, a first port (PORT 0) 726a, a second port (Port 1) 726b, and a third port (Port J) 726c. The ports may be configurable as either unidirectional ports or bi-directional ports. In a particular embodiment, the first port 726a and the second port 726b may correspond to the first port 426a and the second port 426b of FIG. 4 (i.e., unidirectional ports). However, the third port 726c may be a bi-directional port. For example, the third port 726c may be coupled to two FIFO buffers (i.e., the third and fourth FIFO buffers 724c, 724d) and two pipes (i.e., the third and fourth pipes 720c, 720d). Coupling the third port 726c to the third and fourth FIFO buffers 724c, 724d may enable bi-directional data transfer capabilities of the third port 726c. For example, the third port 726c may be configured to support a transmission path that transmits outgoing data from the third buffer 704c via the third pipe 720c and the third FIFO buffer 724c. In addition, the third port 726c may be configured to support a reception path that provides incoming data via the fourth FIFO 724d and the fourth pipe 720d to the fourth buffer 704d. Thus, the third port 726c may enable simultaneous reception and transmission of data via a single port. For example, the outgoing data may be transmitted via the first SLIMbus data line 110 and the incoming data may be received via the second SLIMbus data line 112 in a common bus cycle.

The frame layer 714 may generate the switch select signal 308 and may include the first multiplexer 310 and the second multiplexer 312. The first multiplexer 310 may be associated with transmitting 728 data and the second multiplexer 312 may be associated with receiving 730 data. The switch select signal 308 may cause the first multiplexer 310 to transmit data via the first SLIMbus data line 110, the second SLIMbus data line 112, or any combination thereof, to a fourth multiplexer 310' of a frame layer 714' of the second SLIMbus component 106. The fourth multiplexer 310' may receive the incoming data based on a signal from a second switch select signal 308' of the frame layer 714' of the second SLIMbus component 106. Alternatively, the switch select signal 308 may cause the second multiplexer 310 to receive data via the first SLIMbus data line 110, the second SLIMbus data line 112, or any combination thereof, from a third multiplexer 312' of the frame layer 714' of the second SLIMbus component 106. The third multiplexer 312' may transmit the outgoing data based on a signal from the second switch select signal 308'. The third multiplexer 312' may be associated with transmitting 728' data and the fourth multiplexer 310' may be associated with receiving 730' data. The second chip 702 may also include a transport protocol layer, a generic device layer, a DMA layer, and system level device logic, as illustrated.

It will be appreciated that the use of dual-FIFO ports (e.g., the third port 726c) may effectively double an overall number of available ports in a system, because a single pair of ports may be used for bi-directional communication between two devices instead of using a dedicated pair of uplink ports and a dedicated pair of downlink ports.

Figure 8:
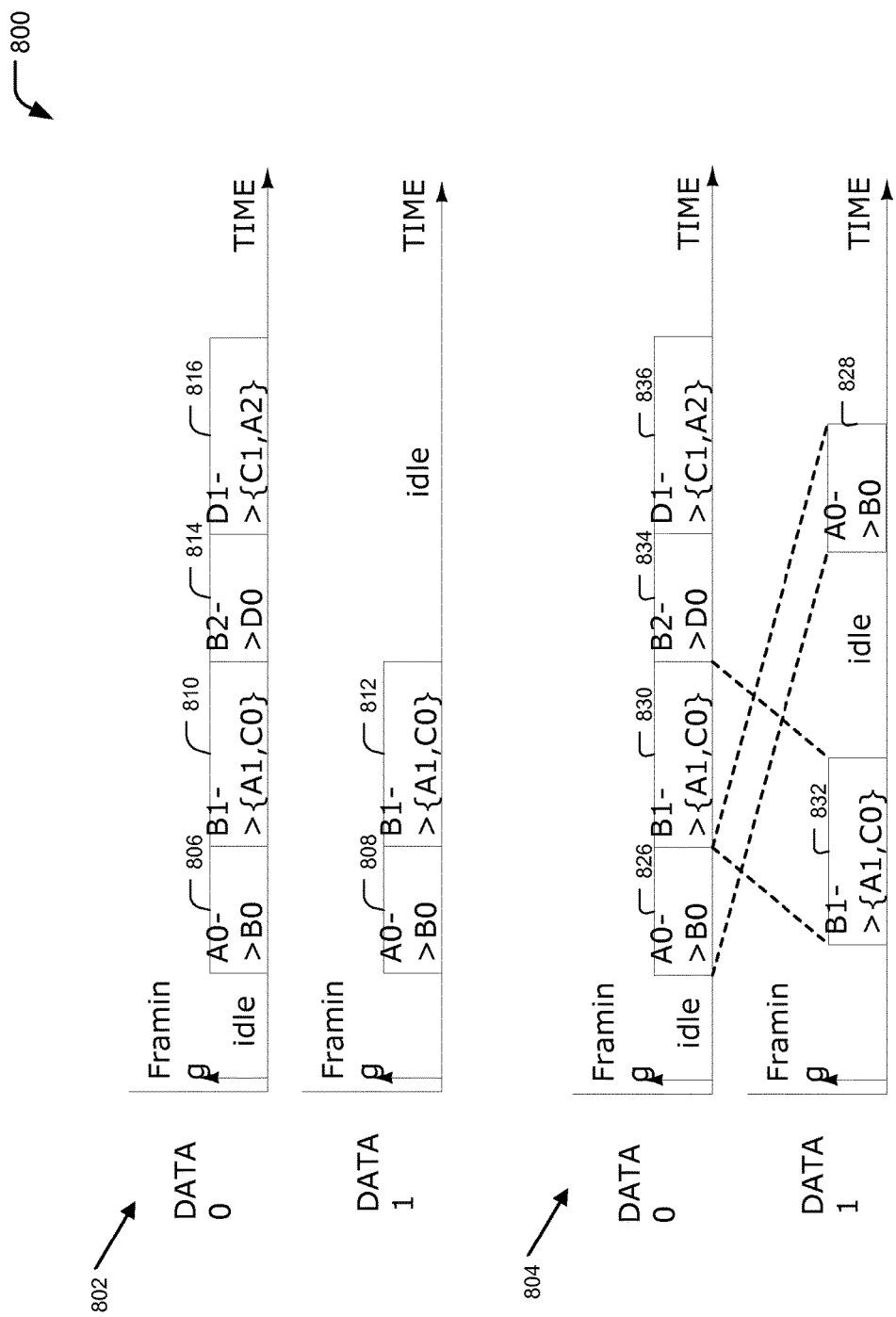
FIG. 8 depicts scheduling diagrams that illustrate particular embodiments of scheduling at the system of FIG. 5.

FIG. 8 depicts scheduling diagrams 800 that illustrate particular embodiments of scheduling at the system 500 of FIG. 5. For example, a first scheduling diagram 802 illustrates a particular embodiment of scheduling at the system 500 of FIG. 5 when common messaging and framing is performed for multiple SLIMbus data lines and a second scheduling diagram 804 illustrates a particular embodiment of scheduling at the system 500 of FIG. 5 when each of multiple SLIMbus data lines has individual messaging and framing (i.e., separate messaging and framing configurations).

The first scheduling diagram 802 illustrates a first example of how data may be communicated from a port of a first SLIMbus component to a port of a second SLIMbus component using time-division multiplexing (TDM). For example, a frame of the first SLIMbus data line (Data 0) 110 may be divided into multiple time slots, such as a first time slot 806, a third time slot 810, a fifth time slot 814, and a sixth time slot 816. A contemporaneous frame of the second SLIMbus data line 112 may be divided into a second time slot 808 and a fourth time slot 812.

As illustrated in the first scheduling diagram 802, when data is sent from the first port 512 of Device A to the first port 520 of Device B, the data may be sent via both the first and second SLIMbus data lines 110, 112 (e.g., during the time slots 806 and 808). Data sent via multiple SLIMbus data lines may be interleaved upon receipt. The first time slot 806 and the second time slot 808 may be associated with a common clock cycle. As a result, the data may be sent via the first and second SLIMbus data lines 110, 112 synchronously, in parallel, simultaneously, and/or substantially simultaneously.

Alternately, or in addition, data may be transmitted from a single source component to multiple destination components. For example, data may be transmitted from the second port 522 of Device B to the second port 514 of Device A and to the first port 528 of Device C via the first SLIMbus data line 110 and the second SLIMbus data line 112 during the time slots 810-812.

During the time slot 814, data may be transmitted from a dual data line capable SLIMbus component to a single data line capable SLIMbus component. For example, data may be transmitted from the third port 524 of Device B to the first port 534 of Device D. During the time slot 816, data may be transmitted from a single data line capable SLIMbus component to a plurality of dual data line capable SLIMbus components. For example, data may be transmitted from the second port 536 of Device D to the third port 516 of Device A and to the second port 530 of Device C.

During the time slots 814-816, the second SLIMbus data line (DATA 1) 112 may be idle, as illustrated in FIG. 8, because Device D is not dual data line capable. In an alternate embodiment, other devices (e.g., Devices A, B, and/or C) may attempt to utilize the idle time slots on DATA 1 by scheduling communication between themselves. It will be appreciated that this may result in systems in which the existence of a second SLIMbus data line is "hidden" from legacy devices that are compatible with a single SLIMbus data line. However, if Device D is the managing device of the system 500, Devices A, B, and C may be dependent on the clock gears chosen by Device D.

The second scheduling diagram 804 illustrates a second example of how data may be communicated from a port of a first SLIMbus component to a port of a second SLIMbus component using time-division multiplexing (TDM). For example, a frame of the first SLIMbus data line (Data 0) 110 may be divided into multiple time slots, such as a first time slot 826, a third time slot 830, a fifth time slot 834, and a sixth time slot 836. A frame of the second SLIMbus data line 112 may be divided into a second time slot 828 and a fourth time slot 832.

As illustrated in the second scheduling diagram 804, when data is sent from the first port 512 of Device A to the first port 520 of Device B, the data may be sent via both the first and second SLIMbus data lines 110, 112 (e.g., during the time slots 826 and 828). Data sent via multiple SLIMbus data lines may be interleaved upon receipt. The first time slot 826 and the second time slot 828 may be associated with different clock cycles. For example, in a particular embodiment where messaging and framing is performed separately for each SLIMbus data line, the first port 512 of Device A may send the data to the first port 520 of Device B over the first SLIMbus data line 110 during the first time slot 826 and over the second SLIMbus data line 112 during the second time slot 828. However, the first time slot 826 and the second time slot 828 may correspond to different clock cycles or bus cycles (i.e., different times). Therefore, in addition to sending data synchronously or in parallel as described with respect to the first scheduling diagram 802, data may be sent from the first port 512 of Device A to the first port 520 of Device B via the first and second SLIMbus data lines 110, 112 during different clock cycles or bus cycles (i.e., asynchronously).

Alternately, or in addition, data may be transmitted from a single source component to multiple destination components. For example, data may be transmitted from the second port 522 of Device B to the second port 514 of Device A and to the first port 528 of Device C via the first SLIMbus data line 110 and the second SLIMbus data line 112 during the time slots 830-832. As described with respect to the first and second time slots 826, 828, data may be transmitted from the second port 522 of Device B to the second port 514 of Device A during different (or overlapping) clock cycles or bus cycles.

During the time slot 834, data may be transmitted from a dual data line capable SLIMbus component to a single data line capable SLIMbus component. For example, data may be transmitted from the third port 524 of Device B to the first port 534 of Device D. During the time slot 836, data may be transmitted from a single data line capable SLIMbus component to a plurality of dual data line capable SLIMbus components. For example, data may be transmitted from the second port 536 of Device D to the third port 516 of Device A and to the second port 530 of Device C.

It will be appreciated that the first scheduling diagram 802 and the second scheduling diagram 804 illustrate scheduling for communicating (i.e., transmitting and/or receiving) data via a single port across multiple data lines during a common clock cycle (i.e., bus cycle) and communicating data via a single port across a single data line. For example, the first port 512 of Device A may communicate data to the first port 520 of Device B across the first and second SLIMbus data lines 110, 112 during a common clock cycle or communicate data across only one of the first and second SLIMbus data lines 110, 112. It will further be appreciated that the second scheduling diagram 804 illustrates scheduling for communicating data for different ports in the same clock cycle across multiple data lines. For example, referring to the second scheduling diagram 804, the first port 512 of Device A may communicate data to the first port 520 of Device B utilizing the first SLIMbus data line 110 during the same clock cycle that the second port 522 of Device B communicates data to the second port 514 of Device A and to the first port 528 of Device C utilizing the second SLIMbus data line 112. Thus, the second scheduling diagram 804 may result in more flexibility during scheduling and may increase bus utilization for message and port streams albeit at increased overhead due to performing separate messaging and framing for multiple SLIMbus data lines. It will further be appreciated that the second scheduling diagram 804 may illustrate overlapping messages and port traffic across multiple data lines for even greater flexibility.

Figure 9:
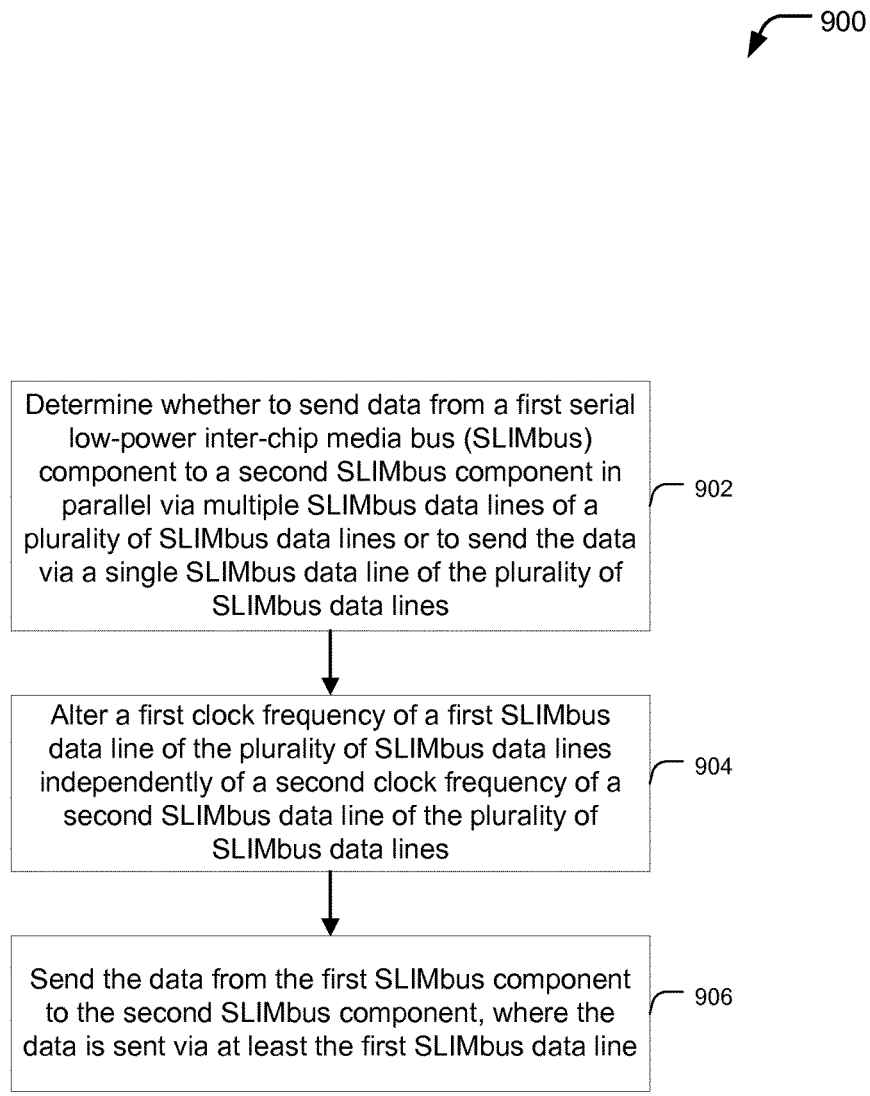
FIG. 9 is a flow diagram to illustrate a particular embodiment of a method of sending data via at least one SLIMbus data line of a plurality of SLIMbus data lines.

FIG. 9 is a flow diagram to illustrate a particular embodiment of a method 900 of sending data via at least one SLIMbus data line of a plurality of SLIMbus data lines to increase bandwidth and throughput on a SLIMbus communication bus. In an illustrative embodiment, the method 900 may be performed at the system 100 of FIG. 1, the system 200 of FIG. 2, the system 300 of FIG. 3, the system 400 of FIG. 4, the system 500 of FIG. 5, the system 700 of FIG. 7, or any combination thereof.

The method 900 may include determining whether to send data from a first SLIMbus component to a second SLIMbus component in parallel via multiple SLIMbus data lines of a plurality of SLIMbus data lines or to send the data via a single SLIMbus data line of the plurality of SLIMbus data lines, at 902. For example, in FIG. 3, the first SLIMbus component 104 may determine whether to transmit data that is compatible with the SLIMbus data transmission protocol via the first SLIMbus data line 110 (i.e., the first incoming SLIMbus data 326 and the first outgoing SLIMbus data 330) or via the second SLIMbus data line 112 (i.e., the second incoming SLIMbus data 328 and the second outgoing SLIMbus data 332). Alternatively, the SLIMbus component 104 may determine to transmit the data in parallel via the multiple SLIMbus data lines 110, 112. In a particular embodiment, the determination may include determining whether the first SLIMbus component and the second SLIMbus component are single data line compatible or multiple data line compatible (e.g., by querying configuration registers, accessing a configuration file, accessing a configuration database, sending user-defined messages, etc.), as described with reference to FIGS. 4-5.

The method 900 may also include altering a first clock frequency of a first SLIMbus data line of the plurality of SLIMbus data lines independently of a second clock frequency of a second SLIMbus data line of the plurality of SLIMbus data lines, at 904. For example, in FIG. 3, the first clock frequency of the first SLIMbus data line 110 may be increased by changing the corresponding gear associated with the first SLIMbus data line 110 from the first gear 222 to the second gear 224. Alternatively, the first clock frequency of the first SLIMbus data line 110 may be decreased by changing the corresponding gear associated with the first SLIMbus data line 110 from the second gear 224 to the first gear 222.

The second clock frequency of the second SLIMbus data line 112 may similarly be altered, independently of the first clock frequency. For example, the second clock frequency of the second SLIMbus data line 112 may be increased by changing the corresponding gear associated with the second SLIMbus data line 112 from the first gear 222 to the second gear 224. Alternatively, the second clock frequency of the second SLIMbus data line 112 may be decreased by changing the corresponding gear associated with the second SLIMbus data line 112 from the second gear 224 to the first gear 222.

The method 900 may also include sending data from the first SLIMbus component to the second SLIMbus component, where the data is sent via at least the first SLIMbus data line, at 906. For example, referring to FIG. 3, data may be sent from the first SLIMbus component 104 to the second SLIMbus component (not shown) via the first SLIMbus data line 110, the second SLIMbus data line 112, or any combination thereof. In an illustrative embodiment, sending the data may include scheduling the data, as described with reference to the scheduling diagram 604 of FIG. 6.

Figure 10:
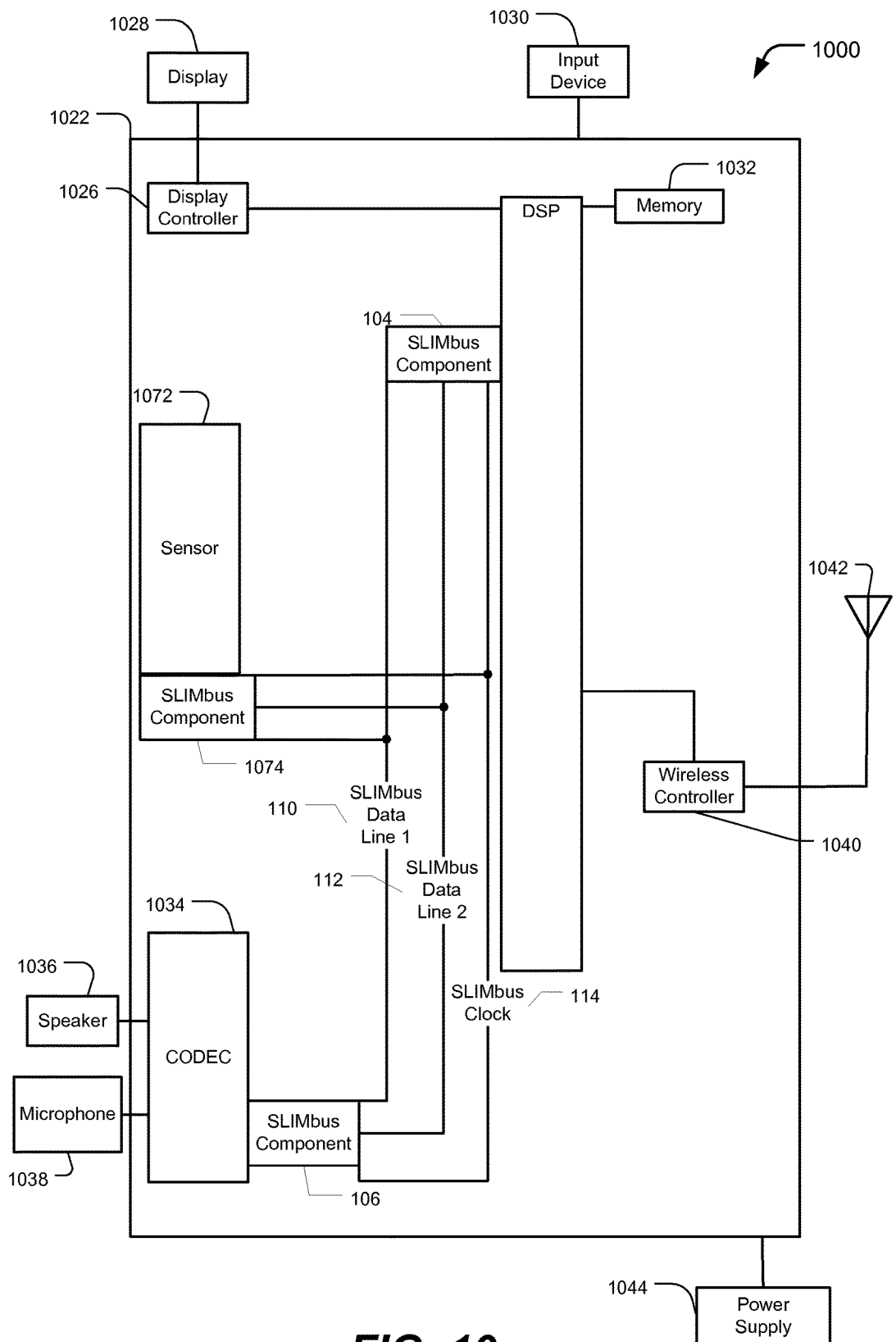
FIG. 10 is a diagram to illustrate a particular embodiment of an electronic device that includes a system including a plurality of SLIMbus data lines between two SLIMbus components.

FIG. 10 depicts a particular illustrative embodiment of a device 1000 into which the system 100 of FIG. 1, the system 200 of FIG. 2, the system 300 of FIG. 3, the system 400 of FIG. 4, the system 500 of FIG. 5, or the system 700 of FIG. 7 may be integrated. The device 1000 may be an electronic device, such as a set-top box, an audio player, a video player, a navigation device, personal digital assistant (PDA), a communications device (e.g., a wireless mobile device), a computing device (e.g., a laptop computer, a tablet computer, a netbook computer, a smartbook computer, etc.), other type of device, or any combination thereof.

The device 1000 may include a digital signal processor (DSP) 1010 that provides processing functionality and supports other components of the device 1000. A CODEC 1034, a display controller 1026, a sensor 1072 and a wireless controller 1040 are coupled to the DSP 1010. In an illustrative embodiment, the CODEC 1034 may be an audio CODEC (e.g., a PCM audio codec or a professional audio codec) or a non-audio CODEC. The CODEC 1034 may be coupled to the second SLIMbus component 106. The sensor 1072 may be coupled to a third SLIMbus component 1074. The DSP 1010 may be coupled to the first SLIMbus component 104. The SLIMbus components 104, 106, 1074 may be connected via the first SLIMbus data line 110, the second SLIMbus data line 112, and the SLIMbus clock line 114. In alternate embodiments, additional components of the device 1000 may include or be coupled to SLIMbus components and connected via the first SLIMbus data line 110, the second SLIMbus data line 112, and the SLIMbus clock line 114. Additional SLIMbus data lines (e.g., the Nth SLIMbus data line 218 of FIG. 2) may also be present.

The DSP 1010 is also coupled to a memory 1032. For example, the memory 1032 may be a non-transitory computer-readable medium storing instructions that are executable by the DSP 1010 or by components of the SLIMbus components 104, 106, or any combination thereof, to perform any of the methods described herein. In a particular embodiment, the memory 1032 includes random access memory (RAM), cache-based memory, register-based memory, tangible non-transitory memory, or any combination thereof.

The display controller 1026 is coupled to a display 1028. A speaker 1036 and a microphone 1038 can be coupled to the CODEC 1034. The wireless controller 1040 can be coupled to a wireless antenna 1042. In a particular embodiment, the DSP 1010, the display controller 1026, the memory 1032, the CODEC 1034, the sensor 1072, the wireless controller 1040, the SLIMbus components 104, 106, the first SLIMbus data line 110, the second SLIMbus data line 112, and the SLIMbus clock line 114 are included in a system-in-package or system-on-chip device 1022. In a particular embodiment, an input device 1030 and a power supply 1044 are coupled to the system-on-chip device 1022. Moreover, in a particular embodiment, as illustrated in FIG. 10, the display 1028, the input device 1030, the speaker 1036, the microphone 1038, the wireless antenna 1042, and the power supply 1044 are external to the system-on-chip device 1022. However, each of the display 1028, the input device 1030, the speaker 1036, the microphone 1038, the wireless antenna 1042, and the power supply 1044 can be coupled to a component of the system-on-chip device 1022, such as an interface or a controller.

Thus, FIG. 10 depicts a particular embodiment of an implementation of a communication architecture that supports the use of a plurality of SLIMbus data lines to increase the bandwidth and throughput on a SLIMbus communications bus. The techniques disclosed herein may also be applicable to other electronic devices, such as set-top boxes, smartphones, laptop computers, netbook computers, tablet computers, smartbook computers, audio players, video players, and navigation devices.

In conjunction with the described embodiments, an apparatus includes means for determining whether a first SLIMbus component is compatible with a bus configuration that includes a plurality of SLIMbus data lines. For example, the means for determining whether the first SLIMbus component is compatible with the bus configuration may include the host 102 of FIG. 1, the system level device logic 404 of FIG. 4, the manager of FIG. 5, the configuration registers 550, 552, 554, 556 of FIG. 5, the system level device logic 704 of FIG. 7, the DSP 1010 programmed to execute the instructions of FIG. 10, or one or more other devices, circuits, modules, or instructions to determine whether the first SLIMbus component is compatible with the bus configuration.

The apparatus may also include means for scheduling one or more packets for transmission to the first SLIMbus component via one or more of the plurality of SLIMbus data lines based at least in part on the determination. For example, the means for scheduling the one or more packets for transmission to the first SLIMbus component may include the host 102 of FIG. 1, the first SLIMbus component 104 of FIG. 1, the second SLIMbus component 106 of FIG. 1, the message channel 306 of FIG. 3, the message port 314 of FIG. 3, the port 302 of FIG. 3, the system level device logic 404 of FIG. 4, the frame layer 414 of FIG. 4, the manager of FIG. 5, the configuration registers 550, 552, 554, 556 of FIG. 5, the framers 518, 526, 532 of FIG. 5, the frame layer 714 of FIG. 7, the system level device logic 704 of FIG. 7, the DSP 1010 programmed to execute the instructions of FIG. 10, or one or more other devices, circuits, modules, or instructions to schedule the one or more packets for transmission to the first SLIMbus component.

The apparatus may also include means for determining whether a second SLIMbus component is compatible with the bus configuration. The means for determining whether the second SLIMbus component is compatible with the bus configuration may include the host 102 of FIG. 1, the system level device logic 404 of FIG. 4, the manager of FIG. 5, the configuration registers 550, 552, 554, 556 of FIG. 5, the system level device logic 704 of FIG. 7, the DSP 1010 of FIG. 10, or one or more other devices, circuits, modules, or instructions to determine whether the second SLIMbus component is compatible with the bus configuration.

The apparatus may also include means for sending at least one configuration message to the first SLIMbus component to program the first SLIMbus component in accordance with the bus configuration in response to a determination that the first SLIMbus component is compatible with the bus configuration. The means for sending the at least one configuration message may include the host 102 of FIG. 1, the first SLIMbus component 104 of FIG. 1, the second SLIMbus component 106 of FIG. 1, the message channel 306 of FIG. 3, the message port 314 of FIG. 3, the port 302 of FIG. 3, the third and fourth multiplexers 316, 318 of FIG. 3, the pipes 420a-c of FIG. 4, the configuration registers 550, 552, 554, 556 of FIG. 5, the framers 518, 526, 532 of FIG. 5, the pipes 720a-c of FIG. 7, the DSP 1010 programmed to execute the instructions of FIG. 10, or one or more other devices, circuits, modules, or instructions to send the at least one configuration message.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a tangible non-transitory storage medium such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device (e.g., a laptop computer) or a user terminal (e.g., a portable wireless device).

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   sending data from a first serial low-power inter-chip media bus (SLIMbus) component to a second SLIMbus component over one or more SLIMbus data lines of a plurality of SLIMbus data lines, wherein the first and second SLIMbus components are coupled via the plurality of SLIMbus data lines, wherein each of the plurality of SLIMbus data lines is associated with a clock frequency; and
   altering a first clock frequency of a first SLIMbus data line separately from a second clock frequency of a second SLIMbus data line of the plurality of SLIMbus data lines, wherein the first clock frequency and the second clock frequency are based on a frequency of a SLIMbus clock line, and wherein the SLIMbus clock line consists of a single clock line coupled between the first and second SLIMbus components.

2. The method of claim 1, further comprising determining whether to send the data in parallel via multiple SLIMbus data lines of the plurality of SLIMbus data lines or to send the data serially via a single SLIMbus data line of the plurality of SLIMbus data lines.

3. The method of claim 1, wherein each of the plurality of SLIMbus data lines is a bi-directional data line.

4. The method of claim 1, wherein at least a portion of the data is sent in accordance with a SLIMbus data transmission protocol.

5. The method of claim 1, further comprising sending first data at a first rate via the first SLIMbus data line and sending second data at a second rate via the second SLIMbus data line, the first rate different from the second rate, and wherein the first rate and the second rate are greater than zero.

6. The method of claim 1, wherein the first clock frequency of the first SLIMbus data line is altered by changing a corresponding gear associated with the first SLIMbus data line.

7. The method of claim 1, further comprising selecting one or more particular SLIMbus data lines of the plurality of SLIMbus data lines to send the data.

8. The method of claim 7, wherein the selection is based at least in part on a switch select signal.

9. The method of claim 1, wherein the first SLIMbus data line supports a first bandwidth and the second SLIMbus data line supports a second bandwidth, and wherein the second bandwidth is greater than or equal to the first bandwidth.

10. The method of claim 1, further comprising sending second data from the first SLIMbus component to the second SLIMbus component via the first SLIMbus data line or a second SLIMbus data line of the plurality of SLIMbus data lines, wherein each of the plurality of SLIMbus data lines is responsive to separate messaging and framing configurations.

11. The method of claim 10, wherein the data and the second data are sent via a single bi-directional port during a common clock cycle.

12. The method of claim 10, wherein the data and the second data are sent via a single bi-directional port during different clock cycles or during overlapping clock cycles.

13. The method of claim 10, wherein the data is sent via a first port and the second data is sent via a second port during a common clock cycle.

14. The method of claim 13, wherein the first port corresponds to the first SLIMbus data line and wherein the second port corresponds to the second SLIMbus data line.

15. The method of claim 1, further comprising a port duplicator coupled to the first SLIMbus component and to the plurality of SLIMbus data lines.

16. The method of claim 15, wherein the port duplicator is configured to provide a multiple SLIMbus data line interface to a port that is compatible with data transmission via a single SLIMbus data line to enable data transmission via the plurality of SLIMbus data lines.

17. The method of claim 15, wherein the port duplicator includes a first multiplexer and a second multiplexer, wherein the first multiplexer is associated with incoming data and the second multiplexer is associated with outgoing data.

18. The method of claim 15, wherein the port duplicator is configured to selectively determine which one or more SLIMbus data lines of the plurality of SLIMbus data lines to utilize when sending the data.

19. The method of claim 18, wherein the determination is based at least in part on a compatibility of at least one of the data and the second SLIMbus component with a single SLIMbus data line SLIMbus configuration.

20. The method of claim 1, wherein the first SLIMbus component is further configured to receive second data from the second SLIMbus component via a second SLIMbus data line of the plurality of SLIMbus data lines, wherein the data is sent and the second data is received via a single bi-directional port of the first SLIMbus component.

21. The method of claim 1, wherein a first clock frequency associated with the first SLIMbus data line is equal to a second clock frequency associated with a second SLIMbus data line of the plurality of SLIMbus data lines.

22. The method of claim 1, wherein the first clock frequency and the second clock frequency are responsive to a first gear of the first SLIMbus component.

23. The method of claim 1, wherein a first clock frequency associated with the first SLIMbus data line is different from a second clock frequency associated with a second SLIMbus data line of the plurality of SLIMbus data lines.

24. The method of claim 23, wherein the first clock frequency is responsive to a first gear of the first SLIMbus component and wherein the second clock frequency is responsive to a second gear of the first SLIMbus component.

25. The method of claim 1, further comprising
determine whether the first SLIMbus component is compatible with a bus configuration that includes a plurality of SLIMbus data lines.

26. The method of claim 25, wherein determining whether the first SLIMbus component is compatible with the bus configuration includes querying a configuration register of the first SLIMbus component.

27. The method of claim 26, wherein the configuration register of the first SLIMbus component is queried during an enumeration process.

28. The method of claim 25, wherein determining whether the first SLIMbus component is compatible with the bus configuration includes transmitting a user-defined message via a messaging channel to the first SLIMbus component.

29. The method of claim 25, wherein determining whether the first SLIMbus component is compatible with the bus configuration includes searching a configuration database that includes compatibility information associated with the SLIMbus component.

30. The method of claim 1, further comprising determining whether the second SLIMbus component is compatible with the bus configuration that includes a plurality of SLIMbus data lines.

31. The method of claim 1, further comprising in response to determining that the first SLIMbus component is compatible with the bus configuration, sending at least one configuration message to the first SLIMbus component to program the first SLIMbus component in accordance with the bus configuration.

32. The method of claim 1, further comprising:
determining whether a first SLIMbus component is compatible with a bus configuration that includes the plurality of SLIMbus data lines; and
scheduling one or more packets for transmission to the first SLIMbus component via one or more of the plurality of SLIMbus data lines based at least in part on the determination.

33. The method of claim 32, further comprising determining whether a second SLIMbus component is compatible with the bus configuration.

34. The method of claim 32, further comprising sending at least one configuration message to the first SLIMbus component to program the first SLIMbus component in accordance with the bus configuration in response to the determination that the first SLIMbus component is compatible with the bus configuration.

35. The method of claim 1, further comprising adjusting a frequency of the single SLIMbus clock line, wherein the first rate of data transfer and the second rate of data transfer are based on the frequency of the single SLIMbus clock line.

36. The method of claim 1, wherein the frequency of the SLIMbus clock line is reduced when the data is sent concurrently via the first SLIMbus data line and the second SLIMbus data line.

37. The method of claim 1, wherein the frequency of SLIMbus clock line is increased when the data is sent via a single SLIMbus data line.

38. The method of claim 1, wherein the first data rate is approximately equal to the second data rate when the data is sent concurrently via the first SLIMbus data line and the second SLIMbus data line.

39. The method of claim 1 wherein a single SLIMbus clock line controls a first rate of data transfer associated with the first SLIMbus data line and a second rate of data transfer associated with the second SLIMbus data line.

40. The method of claim 39, wherein the first rate of data transfer and the second rate of data transfer are based on a frequency of the single SLIMbus clock line.

41. The method of claim 1, further comprising determining a path to send the data from the first SLIMbus component to the second SLIMbus component based on at least a data transmission protocol of each of the plurality of SLIMbus data lines.

42. The method of claim 1, wherein each of the plurality of SLIMbus data lines is responsive to separate messaging and framing configurations.

43. The method of claim 1, wherein the first SLIMbus component is coupled to a port duplicator.

44. The method of claim 1, wherein the first SLIMbus component includes selection logic to adjust the clock frequency of each of the plurality of SLIMbus data lines.

45. The method of claim 1, further comprising increasing the clock frequency of at least one of the plurality of the SLIMbus data lines, decreasing the clock frequency of the at least one of the plurality of the SLIMbus data lines, or any combination thereof.

46. The method of claim 1, wherein the data includes audio data, non-audio data, pulse-code modulation (PCM) audio data, Sony Philips Digital Interface (SPDIF) data, High Definition Audio (HDA) data, professional audio data, or any combination thereof.

47. The method of claim 1, wherein the method is performed in a mobile phone, a cellular phone, a communications device, a portable computer, a set top box, an entertainment unit, a navigation device, a personal digital assistant (PDA), a fixed location data unit, a mobile location data unit, a computer, a desktop computer, a monitor, a computer monitor, a television, a tuner, a radio, a satellite radio, a music player, a digital music player, a portable music player, a video player, a digital video player, a digital video disc (DVD) player, a portable digital video player, or a combination thereof.

48. The method of claim 1, wherein, prior to altering the first clock frequency, the first clock frequency of the first SLIMbus data line is equal to the second clock frequency of the second SLIMbus data line of the plurality of SLIMbus data lines.

\* \* \* \* \*